(12) United States Patent
Kinomura et al.

(10) Patent No.: US 9,539,903 B2
(45) Date of Patent: Jan. 10, 2017

(54) EXTERNAL POWER SUPPLY SYSTEM

(71) Applicants: Shigeki Kinomura, Toyota (JP); Shingo Ueda, Toyota (JP); Yoshitoshi Watanabe, Nagoya (JP); Takaji Umeno, Nisshin (JP)

(72) Inventors: Shigeki Kinomura, Toyota (JP); Shingo Ueda, Toyota (JP); Yoshitoshi Watanabe, Nagoya (JP); Takaji Umeno, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/785,157

(22) PCT Filed: Apr. 15, 2014

(86) PCT No.: PCT/IB2014/000547
§ 371 (c)(1),
(2) Date: Oct. 16, 2015

(87) PCT Pub. No.: WO2014/170737
PCT Pub. Date: Oct. 23, 2014

(65) Prior Publication Data
US 2016/0068066 A1 Mar. 10, 2016

(30) Foreign Application Priority Data
Apr. 18, 2013 (JP) ................. 2013-087380

(51) Int. Cl.
*H02P 9/02* (2006.01)
*B60L 1/00* (2006.01)
(Continued)

(52) U.S. Cl.
CPC ............. *B60L 1/006* (2013.01); *B60L 11/12* (2013.01); *B60L 11/123* (2013.01);
(Continued)

(58) Field of Classification Search
CPC ....................................................... H02P 9/02
(Continued)

(56) References Cited

U.S. PATENT DOCUMENTS

| 7,026,774 B2 * | 4/2006 | Inaba | H02P 6/185 318/400.33 |
| 7,482,777 B2 * | 1/2009 | Tomigashi | H02P 6/18 318/400.02 |

(Continued)

FOREIGN PATENT DOCUMENTS

| EP | 2367279 A1 | 9/2011 |
| JP | H05-38156 A | 2/1993 |

(Continued)

*Primary Examiner* — David S Luo
(74) *Attorney, Agent, or Firm* — Oliff PLC

(57) ABSTRACT

External power supply system includes an electrical storage device, motor, inverter that drives the motor by using electric power of the electrical storage device, and a control device controls the inverter. The inverter includes a first and second switching elements connected in series with each other between a positive and negative electrode power supply lines. A connection-node of the first and second switching elements is connected to one corresponding stator coil. The control device inputs signals to the inverter to drive the inverter such that voltage at the neutral point becomes a predetermined value. The control device compensates for signals in dead time period, the period in which off-state signals are supplied to the first and second switching elements, on the basis of current that is input from the connection-node to one corresponding stator coil or output from one corresponding stator coil to the connection-node while an engine is driven.

7 Claims, 31 Drawing Sheets

(51) Int. Cl.
  *B60L 11/12* (2006.01)
  *H02P 27/08* (2006.01)
  *H02M 7/5387* (2007.01)
  H02M 1/00 (2006.01)
  H02M 1/38 (2007.01)
  H02M 7/5395 (2006.01)
  H02P 25/16 (2006.01)
  H02P 101/45 (2015.01)

(52) U.S. Cl.
  CPC ............ *H02M 7/5387* (2013.01); *H02P 9/02* (2013.01); *H02P 27/08* (2013.01); *H02M 7/5395* (2013.01); *H02M 2001/007* (2013.01); *H02M 2001/385* (2013.01); *H02P 25/16* (2013.01); *H02P 2101/45* (2015.01)

(58) Field of Classification Search
  USPC .......................................... 318/700, 34, 558
  See application file for complete search history.

(56) References Cited

U.S. PATENT DOCUMENTS

| | | |
|---|---|---|
| 2009/0159348 A1 | 6/2009 | Oyobe et al. |
| 2011/0221368 A1 | 9/2011 | Yabuguchi |

FOREIGN PATENT DOCUMENTS

| | | |
|---|---|---|
| JP | 2004-120965 A | 4/2004 |
| JP | 2007-097285 A | 4/2007 |
| JP | 2010-098851 A | 4/2010 |
| JP | 2011-193637 A | 9/2011 |

\* cited by examiner

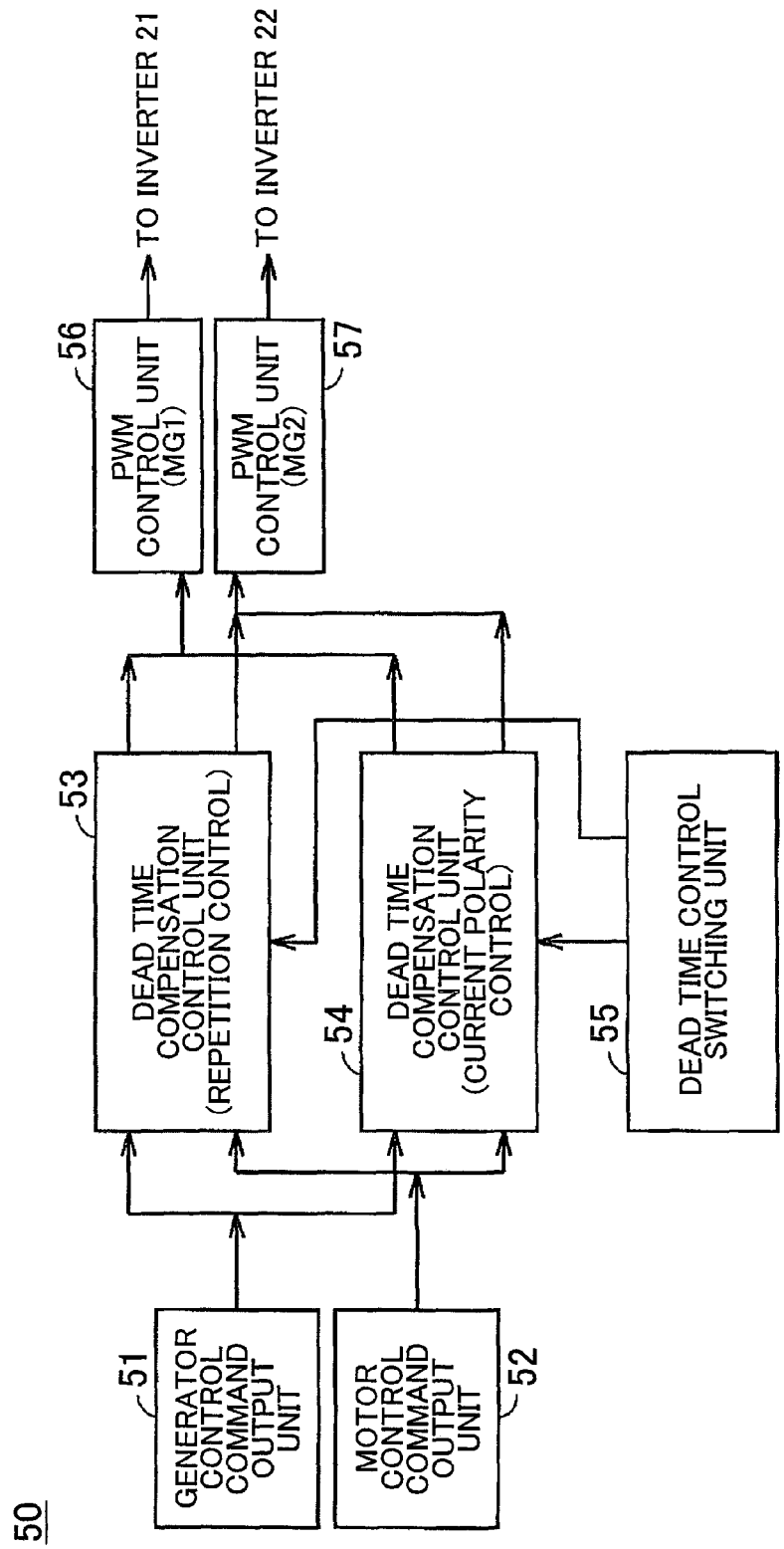

FIG. 7

| | DEAD TIME COMPENSATION BASED ON REPETITION CONTROL | DEAD TIME COMPENSATION BASED NO INVERTER OUTPUT CURRENT POLARITY |
|---|---|---|
| ENGINE OPERATION | • ENGINE ROTATION SPEED IS FIXED (WHEN MAXIMUM CHARGING THROUGH ENGINE POWER GENERATION) | • FLUCTUATION IN ENGINE ROTATION SPEED<br>• WHEN FOLLOWING CONDITION OCCURS EVEN WHEN ENGINE ROTATION SPEED IS FIXED (• WHEN ANY ONE OF VH, CARRIER FREQUENCY AND NEUTRAL POINT VOLTAGE SHARE IS CHANGED) |
| ENGINE STOP | • CONSTANTLY EXECUTED | • CONSTANTLY NOT EXECUTED |

FIG.18

| | i) WHEN U-PHASE, V-PHASE AND W-PHASE OUTPUTS ARE VH | ii) WHEN U-PHASE AND V-PHASE OUTPUTS ARE VH, AND W-PHASE OUTPUT IS N |
|---|---|---|
| VU (U-PHASE OUTPUT) | ⎍ VH / N | ⎍ VH / N |
| VV (V-PHASE OUTPUT) | ⎍ VH / N | ⎍ VH / N |
| VW (W-PHASE OUTPUT) | ⎍ VH / N | ──── N |
| VO NEUTRAL POINT OUTPUT | ⎍ VH / N | ⎍ 2/3VH / N |

F I G. 19
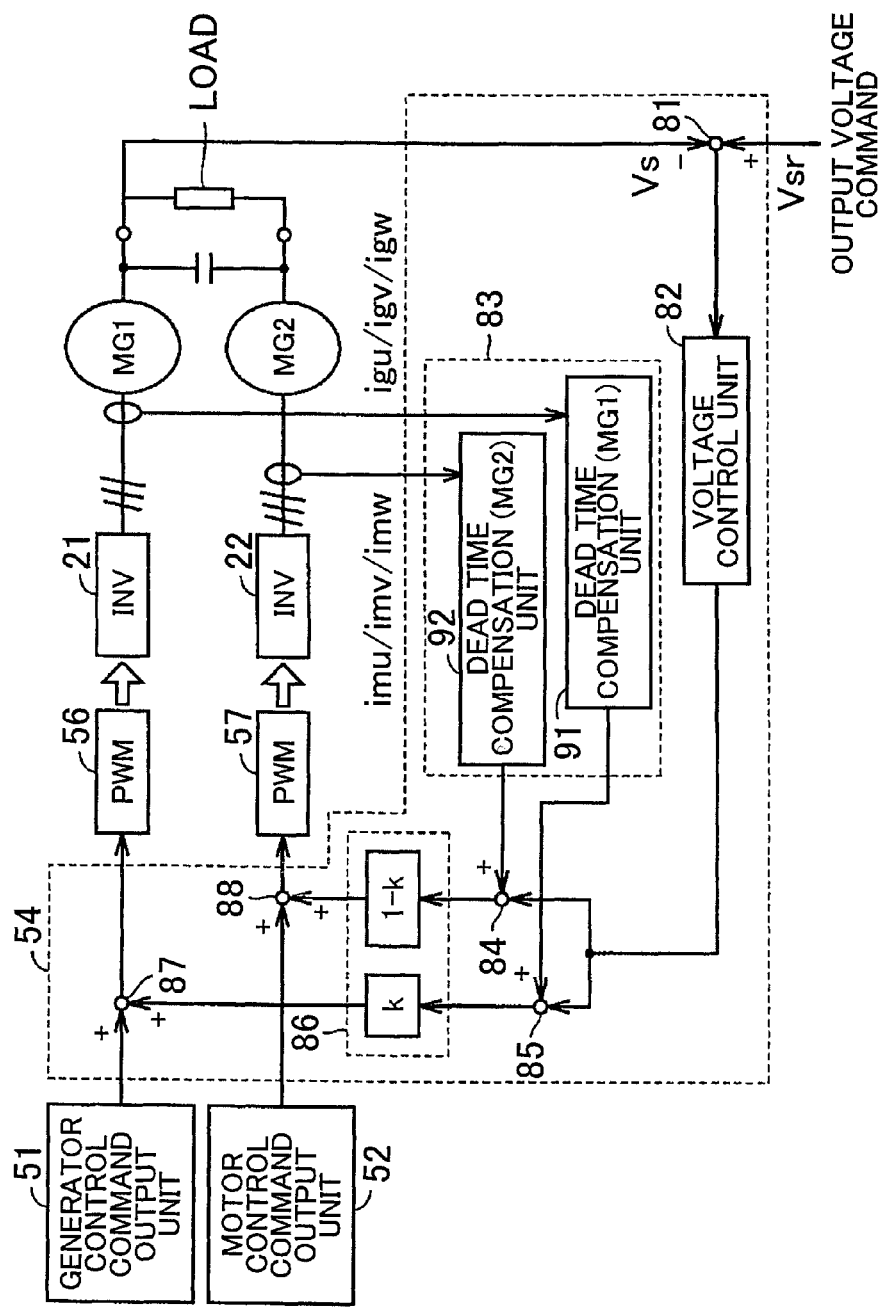

F I G . 32
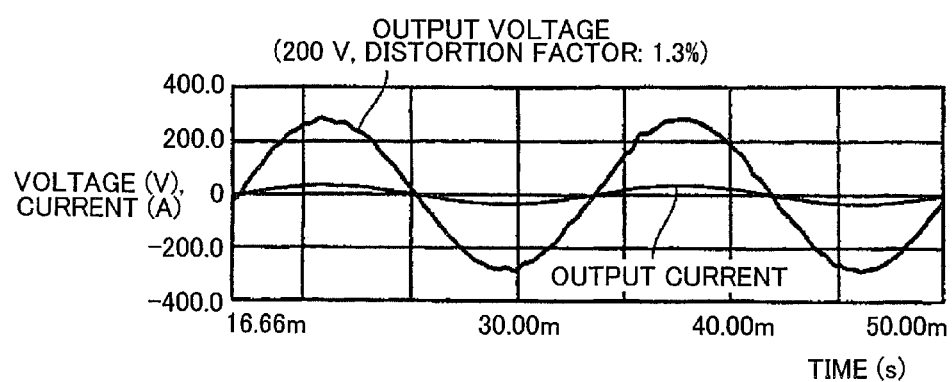

EXTERNAL POWER SUPPLY SYSTEM

BACKGROUND OF THE INVENTION

1. Field of the Invention

The invention relates to an external power supply system and, more particularly, to an external power supply system configured to output electric power of an electrical storage device to an external device via an inverter.

2. Description of Related Art

Japanese Patent Application Publication No. 2010-098851 (JP 2010-098851 A) describes a hybrid vehicle configured to charge a battery with the use of an external power supply connected to neutral points of motor generators.

It is conceivable to supply electric power from the battery to a device outside the vehicle by utilizing the neutral points of the motor generators of the hybrid vehicle including the configuration as described in JP 2010-098851 A.

However, because there occurs an error in dead time period that is a period during which an off-state driving signal is supplied to both upper-arm and lower-arm switching elements of an inverter (hereinafter, such an error is termed dead time error), there also occurs an error in output of electric power from the neutral points. Particularly, there is a difference in dead time error between when an engine is driven and when the engine is not driven, so it is required to appropriately compensate for an inverter command value in dead time period when the engine is driven.

SUMMARY OF THE INVENTION

The invention provides an external power supply system in which an output error in dead time period is reduced.

An aspect of the invention provides an external power supply system. The external power supply system includes: an electrical storage device; a motor; an inverter configured to drive the motor by using electric power of the electrical storage device; and a control unit configured to control the inverter. The motor includes stator coils connected to a neutral point. The neutral point is an output node from which electric power from the electrical storage device is supplied to an external device. The inverter includes a first switching element and a second switching element connected in series with each other between a positive electrode power supply line and a negative electrode power supply line. A connection node of the first switching element and the second switching element is connected to a corresponding one of the stator coils. The control unit is configured to input the driving signals to the inverter so as to drive the inverter such that a voltage at the neutral point becomes a predetermined value. The control unit is configured to compensate for the driving signals in a dead time period, which is a period in which off-state driving signals are supplied to the first switching element and the second switching element, on the basis of a current that is input from the connection node to the corresponding one of the stator coils or output from the corresponding one of the stator coils to the connection node while an engine is driven.

The stator coils may include a U-phase coil, a V-phase coil and a W-phase coil of which one ends are connected to the neutral point. The connection node of the first switching element and the second switching element may be connected to the other end of the U-phase coil. The inverter may further include a third switching element, a fourth switching element, a fifth switching element and a sixth switching element, the third switching element and the fourth switching element being connected in series with each other between the positive electrode power supply line and the negative electrode power supply line, a connection node of the third switching element and the fourth switching element being connected to the other end of the V-phase coil, the fifth switching element and the sixth switching element being connected in series with each other between the positive electrode power supply line and the negative electrode power supply line, a connection node of the fifth switching element and the sixth switching element being connected to the other end of the W-phase coil. The current that is input from the connection node to the corresponding one of the stator coils or output from the corresponding one of the stator toils to the connection node may include a current flowing through the U-phase coil, a current flowing through the V-phase coil and a current flowing through the W-phase coil.

Another aspect of the invention provides an external power supply system. The external power supply system includes: an electrical storage device; a motor; an inverter configured to drive the motor by using electric power of the electrical storage device; and a control unit configured to control the inverter. The motor includes stator coils connected to a neutral point. The inverter includes a first switching element and a second switching element connected in series with each other between a positive electrode power supply line and a negative electrode power supply line. A connection node of the first switching element and the second switching element is connected to a corresponding one of the stator coils. The control unit is configured to input the driving signals to the inverter so as to drive the inverter such that a voltage at the neutral point becomes a predetermined value. The control unit is configured to compensate for the driving signals in a dead time period, which is a period in which off-state driving signals are supplied to the first switching element and the second switching element, on the basis of a rotation angle of the motor while an engine is driven.

In any one of the above-described external power supply systems, the control unit may be configured to repeatedly compensate for the driving signals on the basis of an error one period before in an output voltage at the neutral point while the engine is not driven.

In any one of the above-described external power supply systems, the control unit may be configured to compensate for the driving signals in the dead time period when one of an output voltage of the inverter and a carrier frequency of the inverter is changed while the engine is not driven.

Any one of the above-described external power supply systems may further include a second motor and a second inverter. An external load may be connected between the neutral point and the second neutral point. The second neutral point may be a neutral point of stator coils of the second motor. The control unit may be configured to compensate for the driving signals in the dead time period when a voltage share between the inverter and the second inverter is changed while the engine is not driven.

The external power supply system may further include an engine. The motor may be configured to be able to generate electric power upon reception of mechanical power from the engine.

According to the aspects of the invention, an output error in a dead time period is reduced, so the quality of feeding electric power improves.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a block diagram that shows a configuration associated with compensation control over a dead time period, which is executed by a control device shown in FIG. 1;

FIG. 7 is a table for illustrating how the mode of compensation for a dead time period is used;

FIG. 18 shows waveform charts for illustrating an inverter output error during engine operation;

FIG. 19 is a block diagram that shows the configuration of a dead time compensation control unit when compensation control based on current polarity is executed;

FIG. 32 is a waveform chart of output voltage and output current after the measures according to the first alternative embodiment are taken.

DETAILED DESCRIPTION OF EMBODIMENTS

Figure 1:
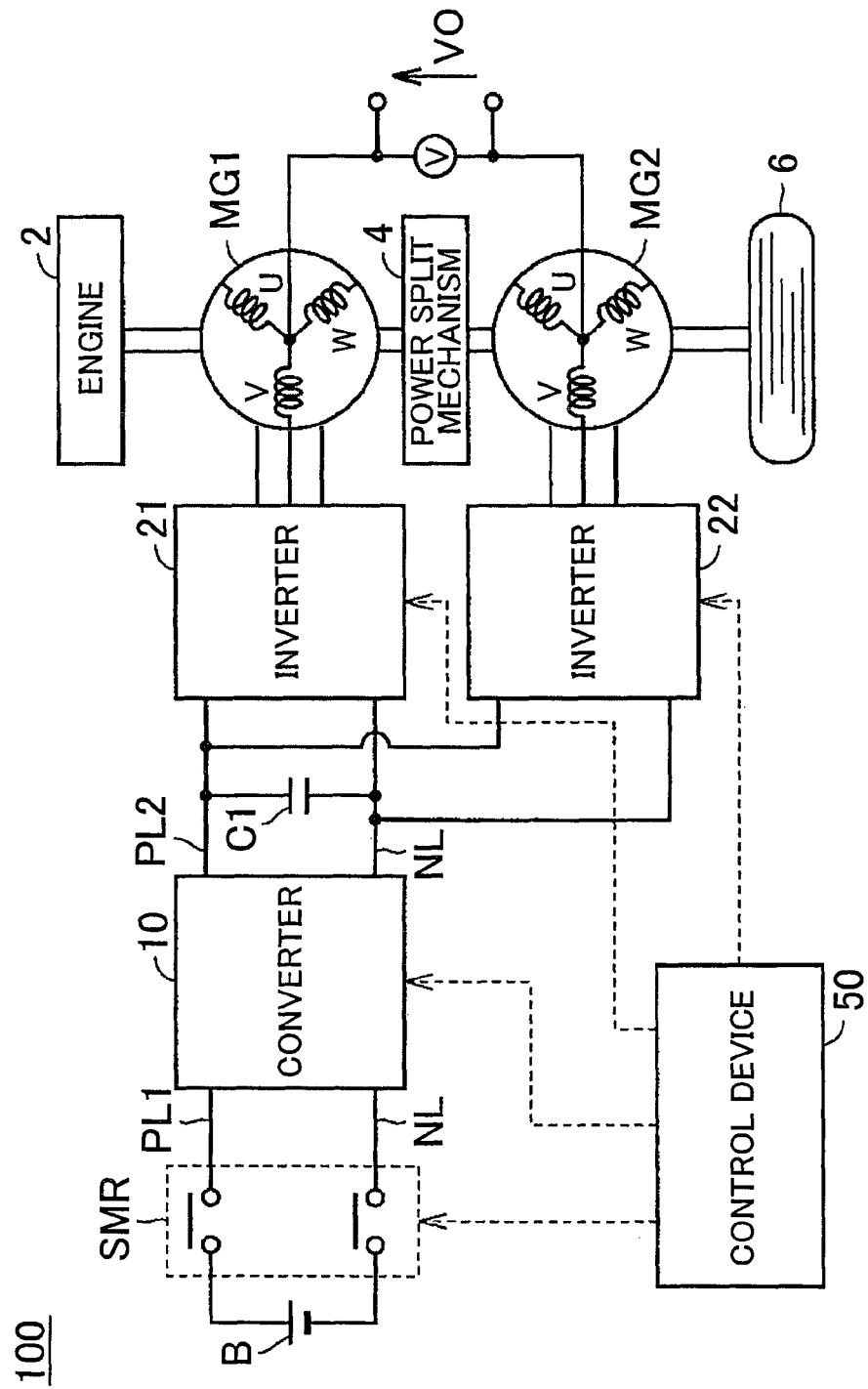
FIG. 1 is a block diagram that shows the overall configuration of a vehicle to which an external power supply system according to a first embodiment is applied.

Hereinafter, embodiments of the invention will be described in detail with reference to the accompanying drawings. Like reference numerals denote the same or corresponding components in the drawings, and the description will not be repeated.

First Embodiment

FIG. 1 is a block diagram that shows the overall configuration of a vehicle to which an external power supply system according to a first embodiment is applied. In the following embodiments, the vehicle is a hybrid vehicle. However, the vehicle according to the invention is not limited to a hybrid vehicle. As shown in FIG. 1, the vehicle 100 includes an engine 2, motor generators MG1, MG2, a power split mechanism 4 and a drive wheel 6. The vehicle 100 further includes an electrical storage device B, a system main relay SMR, a converter 10, inverters 21, 22 and a control device 50.

The vehicle 100 is a hybrid vehicle that travels with the use of the engine 2 and the motor generator MG2 as power sources. Driving force generated by the engine 2 and the motor generator MG2 is transmitted to the drive wheel 6.

The engine 2 is an internal combustion engine, such as a gasoline engine and a diesel engine, that outputs power by burning fuel. The engine 2 is configured to be electrically controllable in an operating state, such as a throttle opening degree (intake air amount), a fuel supply amount and ignition timing, by a signal from the control device 50.

The motor generators MG1, MG2 are alternating-current rotary electric machines, and are, for example, three-phase alternating-current synchronous motors. The motor generator MG1 is used as a generator that is driven by the engine 2, and is also used as a rotary electric machine that is able to start the engine 2. Electric power that is obtained through power generation of the motor generator MG1 is allowed to be used to drive the motor generator MG2. Electric power that is obtained through power generation of the motor generator MG1 is allowed to be supplied to an external device that is connected to the vehicle 100. The motor generator MG2 is mainly used as a rotary electric machine that drives the drive wheel 6 of the vehicle 100.

The power split mechanism 4, for example, includes a planetary gear mechanism having three rotary shafts, that is, a sun gear, a carrier and a ring gear. The sun gear is coupled to a rotary shaft of the motor generator MG1. The carrier is coupled to a crankshaft of the engine 2. The ring gear is coupled to a drive shaft. The power split mechanism 4 splits the driving force of the engine 2 into power that is transmitted to the rotary shaft of the motor generator MG1 and power that is transmitted to the drive shaft. The drive shaft is coupled to the drive wheel 6. The drive shaft is also coupled to a rotary shaft of the motor generator MG2.

The electrical storage device B is a chargeable and dischargeable direct-current power supply, and is, for example, formed of a secondary battery such as a nickel metal hydride battery and a lithium ion battery, a capacitor, or the like. The electrical storage device B supplies electric power to the converter 10, and is charged with electric power from the converter 10 during regeneration of electric power.

The system main relay SMR is provided in a positive electrode power supply line PL1 and a negative electrode power supply line NL that connect the electrical storage device B to the converter 10. The system main relay SMR is a relay for electrically connecting or interrupting the electrical storage device B to or from an electrical system. The on/off state of the system main relay SMR is controlled by the control device 50.

The converter 10 receives electric power from the electrical storage device via the positive electrode power supply line PL1 and the negative electrode power supply line NL. The converter 10 steps up voltage from the electrical storage device B, and supplies the stepped-up voltage to the inverters 21, 22 via a positive electrode power supply line PL2 and the negative electrode power supply line NL. The negative electrode power supply line NL is a power supply line common to the input side and output side of the converter 10. A smoothing capacitor C1 is connected between the positive electrode power supply line PL2 and the negative electrode power supply line NL.

The converter 10 charges the electrical storage device B while stepping down voltage generated by the motor generator MG1 or the motor generator MG2 and rectified by a corresponding one of the inverters 21, 22.

The inverters 21, 22 are connected to the converter 10 in parallel with each other. The inverters 21, 22 are controlled by signals from the control device 50. The inverter 21 drives the motor generator MG1 by converting direct-current power, supplied from the converter 10, to alternating-current power. The inverter 22 drives the motor generator MG2 by converting direct-current power, supplied from the converter 10, to alternating-current power.

Each of the inverters 21, 22 is configured to be able to supply voltage VO to an external device (not shown) via a neutral point of stator coils of a corresponding one of the motor generators MG1, MG2.

The control device 50 determines a target driving force, which is transmitted to the drive wheel 6, on the basis of an accelerator operation amount, a brake depression amount, a vehicle speed, and the like. The control device 50 controls the engine 2 and the motor generators MG1, MG2 so as to achieve an operating state such that the target driving force is efficiently output.

In the above-described configuration, the control device 50 is required to control the inverters 21, 22 in response to an external device that is connected to the vehicle 100, at the time when external discharging is carried out. Specifically, a required voltage of an external device and the maximum value of current acceptable by a load device (hereinafter, referred to as maximum current value) depend on each external device. Therefore, the control device 50 outputs voltage according to the required, voltage of the external device that is connected to the vehicle 100 or limits output current such that the output current does not exceed the maximum current value.

Figure 2:
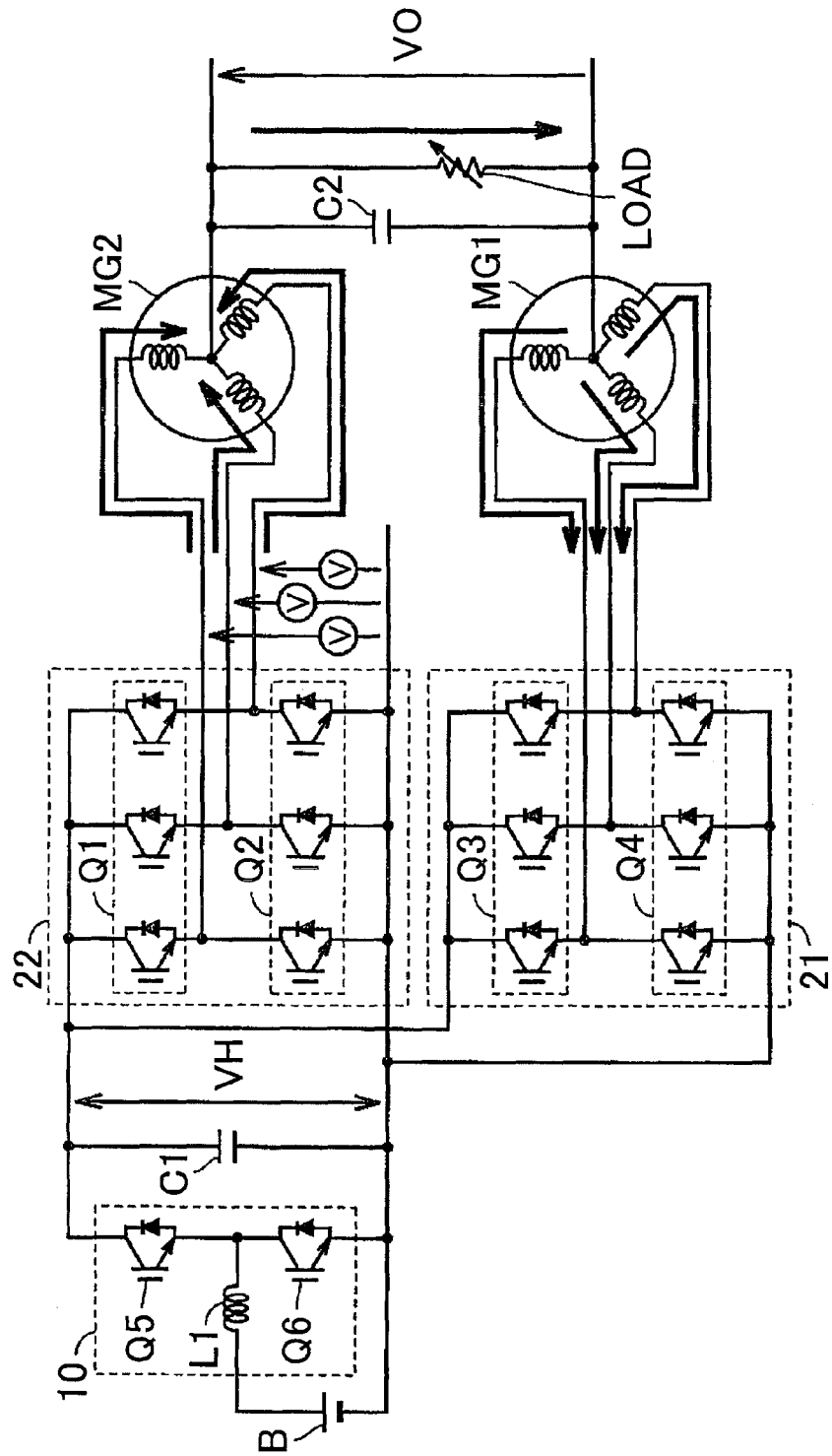
FIG. 2 is a view for illustrating the circuit configuration of a converter and an inverter and currents that flow at the time when electric power is supplied from a neutral point.

FIG. 2 is a view for illustrating the circuit configuration of the converter and inverters and currents that flow at the time when electric power is supplied from the neutral points. As shown in FIG. 2, the converter 10 includes a reactor L1 and switching elements Q5, Q6. A diode is connected in antiparallel with each of the switching elements Q5, Q6.

The inverter 22 includes upper arm switching elements Q1 and lower arm switching elements Q2. The switching elements Q1 include three switching elements corresponding to U-phase, V-phase and W-phase stator coils. The switching elements Q2 include three switching elements corresponding to the U-phase, V-phase and W-phase stator coils.

The inverter 21 includes upper arm switching elements Q3 and lower arm switching elements Q4. The switching elements Q3 include three switching elements corresponding to U-phase, V-phase and W-phase stator coils. The switching elements Q4 include three switching elements corresponding to the U-phase, V-phase and W-phase stator coils.

Each of the above-described switching elements Q1 to Q6 may be, for example, an IGBT element. Another element (MOS), or the like, may also be used instead.

In neutral point power generation, the U-phase, V-phase and W-phase switching elements carry out switching together. Therefore, as far as the engine is stopped, inverter currents are equal among the phases. That is, as indicated by the arrows in FIG. 2, currents having the same phase and the same amplitude flow through the U phase, the V phase and the W phase.

Figure 3:
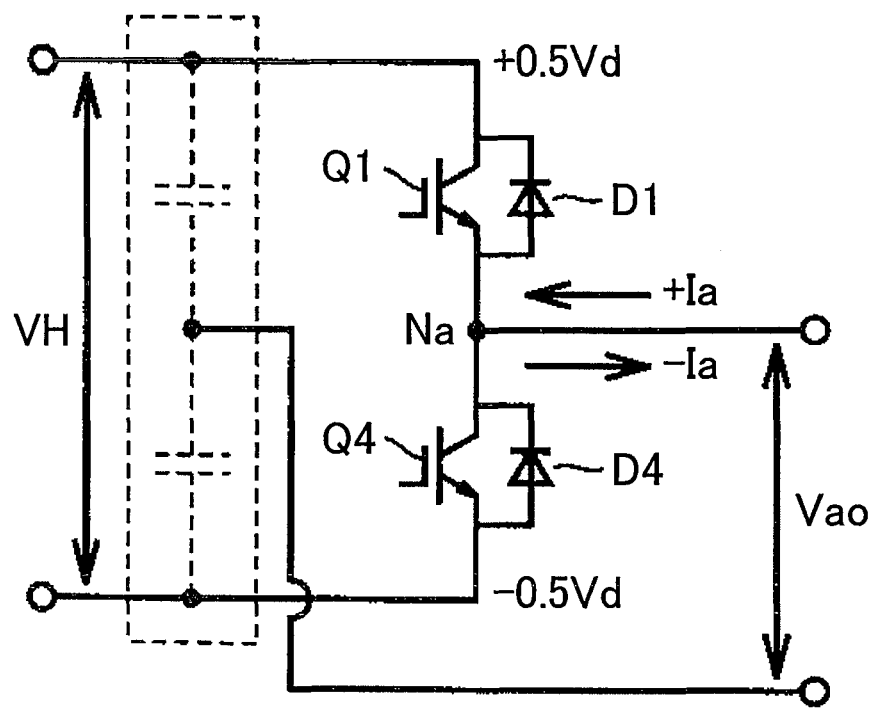
FIG. 3 is a view that schematically shows one-phase inverter circuit.
Figure 4:
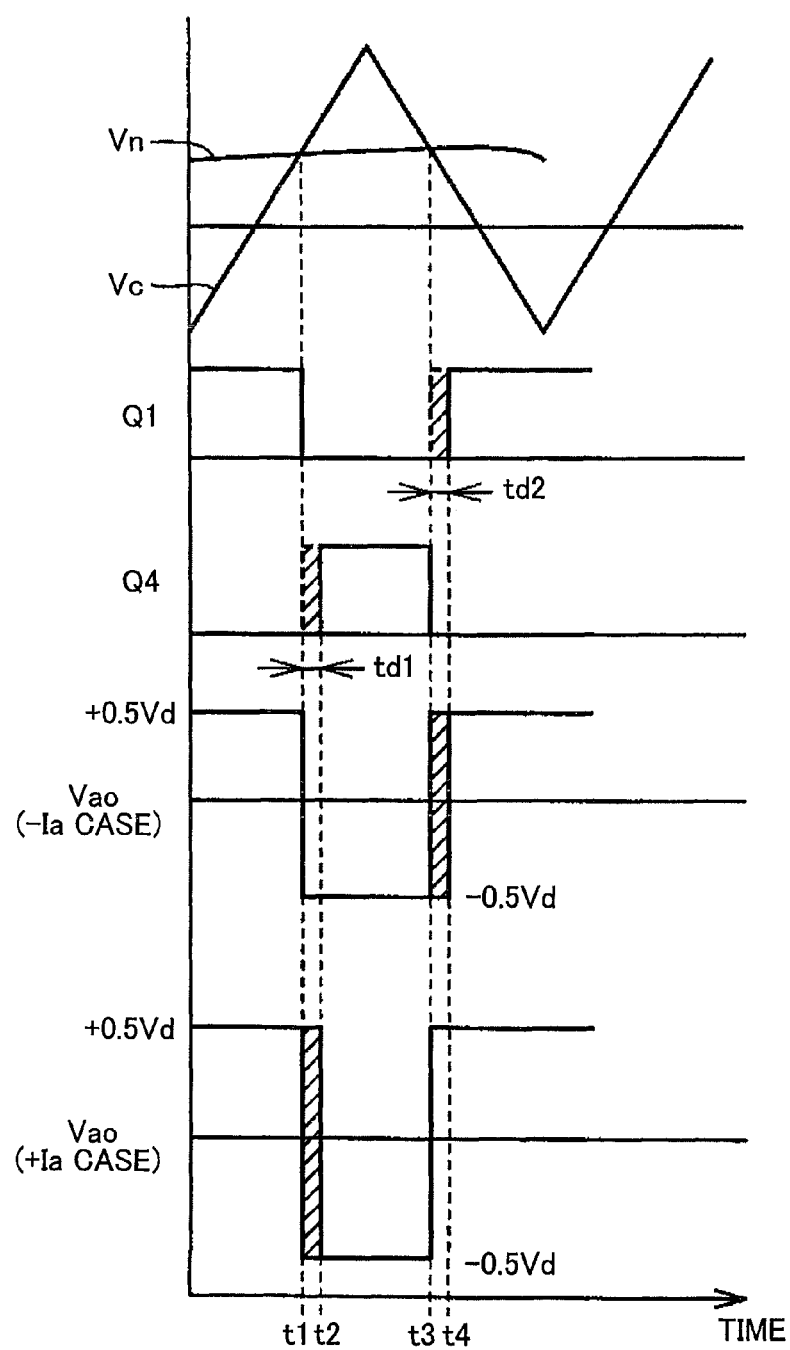
FIG. 4 is a waveform chart for illustrating the principle of occurrence of an error in a dead time period of the inverter.

FIG. 3 is a view that schematically shows one-phase inverter circuit. FIG. 4 is a waveform chart for illustrating the principle of occurrence of an error in a dead time period of the inverter.

The mechanism of occurrence of a dead time error in the inverter will be described with reference to FIG. 3 and FIG. 4. Time t1 and time t3 at which a voltage command Vn crosses a carrier signal Vc are ideal on/off switching points of each of the switching elements Q1, Q4.

However, if the upper arm and lower arm of the inverter turn on at the satte time, a short-circuit state occurs. Therefore, actually, the gate of the switching element Q1 is turned off at time t1, and the gate of the switching element Q4 is turned on at time t2. A time between the time t1 and the time t2 is a dead time.

Similarly, the gate of the switching element Q4 is turned off at time t3, and the gate of the switching element Q1 is turned on at time t4. A time between the time t3 and the time t4 is a dead time.

Here, when the direction of current is −Ia as shown in FIG. 3, an inverter output voltage Vao changes from +0.5Vd to −0.5Vd at time t1, and the inverter output voltage Vao changes from −0.5Vd to +0.5Vd at time t3. In this case, as indicated by the oblique lines, the waveform varies earlier than ideal timing t4 when the voltage Vao rises, and an output error voltage due to the dead time occurs. A zero potential of the voltage Vao is set at the intermediate potential of a voltage VH. A connection node of two capacitors imaginarily indicated by the dashed line in FIG. 3 corresponds to the zero potential of the voltage Vao.

On the other hand, when the direction of current is +Ia as shown in FIG. 3, the inverter output voltage Vao changes from +0.5Vd to −0.5Vd at time t2, and the inverter output voltage Vao changes from −0.5Vd to +0.5Vd at time t4. In this case, as indicated by the oblique lines, the waveform varies later than ideal timing t1 when the voltage Vao falls, and an output error voltage due to the dead time occurs.

Figure 5:
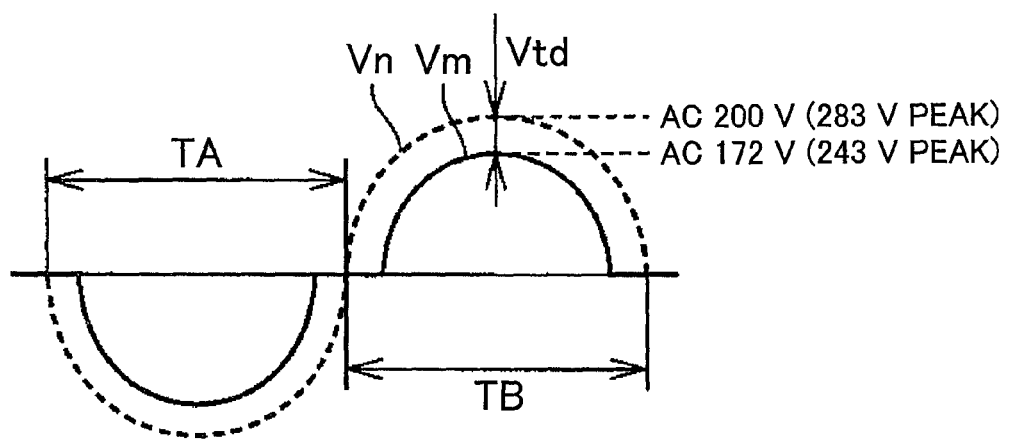
FIG. 5 is a view for illustrating a voltage drop due to an error that occurs in a dead time period.

FIG. 5 is a view for illustrating a voltage drop due to an error that occurs in a dead time period. As shown in FIG. 5, a voltage corresponding to a neutral point output voltage command value is indicated by the dashed line Vn, and an actual neutral point output voltage is indicated by the continuous line Vm. In a period TA in which the current polarity is +Ia, the continuous line Vm is higher than the dashed line Vn. In a period TB in which the current polarity is −Ia, the continuous line Vm is lower than the dashed line Vn. In any case, the continuous line Vm that is an actual voltage is lower in absolute value than the dashed line Vn that is a command value. At a portion at which Vm is close to zero, the polarity of current and the polarity of output error frequently repeat inversion, so there occurs a portion in a predetermined period in which Vm is fixed to 0.

For example, when the command value Vn is AC 200 V (283 V peak), the actual neutral point output voltage Vm drops to AC 172 V (243 V peak). In this case, a drop amount Vtd at the peak value is 40 V. The Vtd is an output error voltage of the inverter.

The output error voltage Vtd of the inverter is allowed to be calculated by the following mathematical expression (1).

$$Vtd(V) = VH(V) \times td(\text{sec}) \times fc(\text{Hz}) \quad (1)$$

Here, Vtd denotes the output error voltage, VH denotes the inverter power supply voltage VH shown in FIG. 3, td denotes a temporal difference (td1 or td2) with respect to the ideal timing shown in FIG. 4, and fc denotes a carrier frequency.

When VH=500 V, td=8 μs and fc=10 kHz, Vtd is calculated as 40 V from the mathematical expression (1).

FIG. 6 is a block diagram that shows a configuration associated with compensation control over a dead time period, which is executed by the control device 50 shown in FIG. 1. As shown in FIG. 6, the control device 50 includes a generator control command output unit 51, a motor control command output unit 52, dead time compensation control units 53, 54, a dead time control switching unit 55 and PWM control units 56, 57.

The PWM control unit 56 outputs a PWM signal to the inverter 21 that drives the motor generator MG1. The PWM control unit 57 outputs a PWM signal to the inverter 22 that drives the motor generator MG2.

The dead time control switching unit 55 selectively activates one of the dead time compensation control unit 53 for executing repetition control and the dead time compensation control unit 54 for executing current polarity control on the basis of the state of the engine and the state of the power supply system.

FIG. 7 is a table for illustrating how the mode of compensation for a dead time period is used. The dead time control switching unit 55 shown in FIG. 6 determines whether the dead time compensation control unit 53 based on repetition control or the dead time compensation control unit 54 based on inverter output current polarity is used on the basis of the cases shown in FIG. 7.

During engine operation, when the engine rotation speed is fixed and the electrical storage device B is maximally charged through engine power generation, the dead time compensation control unit 53 based on repetition control is used.

During engine operation, when the engine rotation speed is fluctuating or when there occurs a predetermined condition even when the engine rotation speed is fixed, the dead time compensation control unit 54 based on inverter output current polarity is used. The predetermined condition here is a condition that any one of the voltage VH, the carrier frequency fc and a neutral point voltage share k is changed.

On the other hand, while the engine is stopped, the dead time compensation control unit 53 based on repetition control is constantly used. During engine stop, the dead time compensation control unit 54 based on inverter output current polarity is not used.

Figure 8:
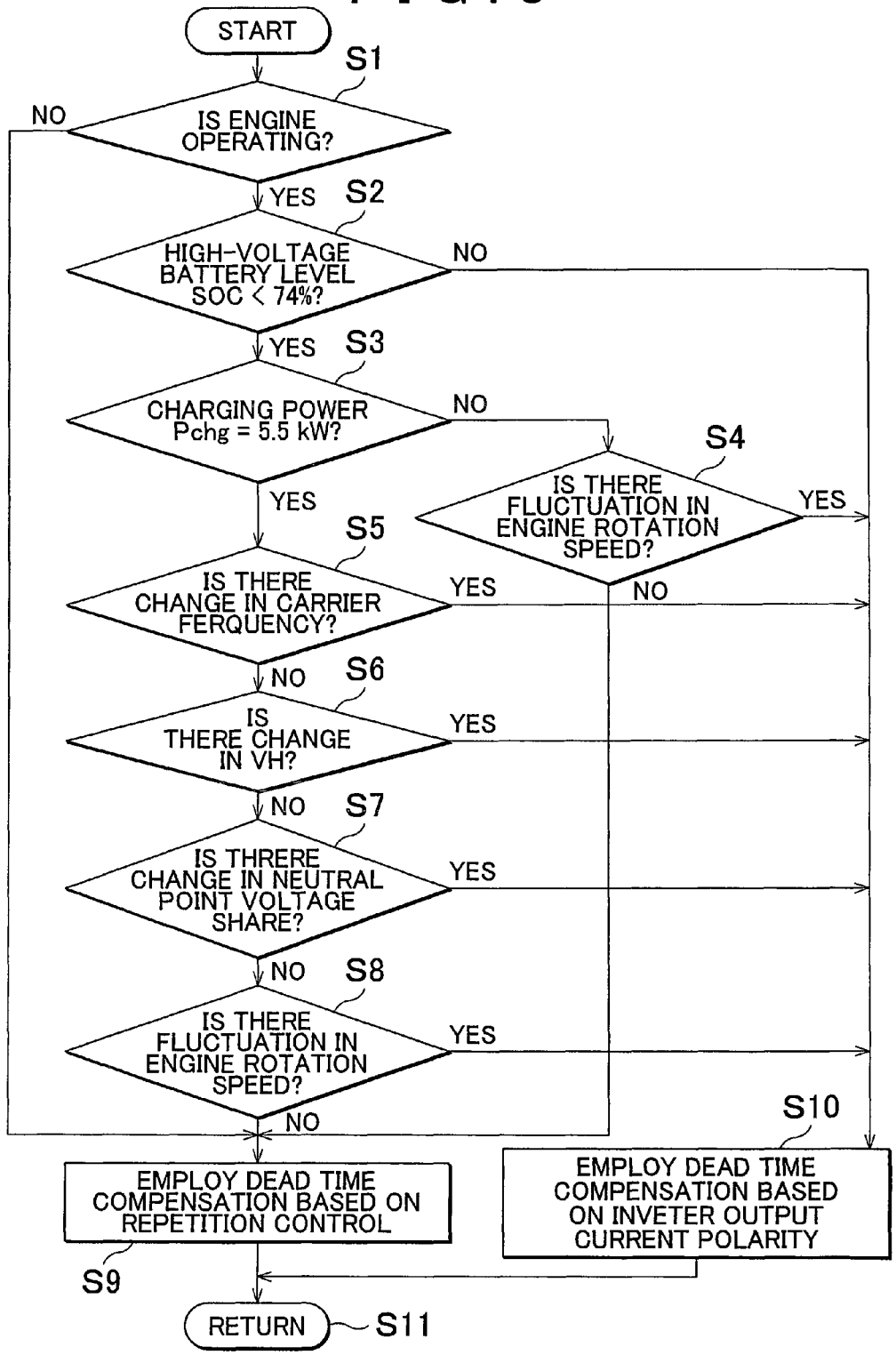
FIG. 8 is a flowchart for illustrating control for switching the mode of compensation for a dead time period.

FIG. 8 is a flowchart for illustrating control for switching the mode of compensation for a dead time period. The process of the flowchart is called from a main routine and executed at constant time intervals or each time the predetermined condition is satisfied. The process of the flowchart corresponds particularly to the process that is executed by the dead time control switching unit 55 shown in FIG. 6 within the control device 50 shown in FIG. 1.

As shown in FIG. 1 and FIG. 8, initially, when the process is started, it is determined in step S1 whether the engine is operating. When it is determined in step S1 that the engine is not operating (is stopped), the process proceeds to step S9, and dead time compensation based on repetition control is employed. On the other hand, when it is determined in step S1 that the engine is operating, the process proceeds to step S2.

In step S2, it is determined whether a battery level (also referred to as state of charge (SOC)) of the electrical storage device B is lower than a predetermined percentage (for example, 74%).

When the SOC is not lower than 74% in step S2, the process proceeds to step S10, and dead time compensation based on inverter output current polarity is employed. On the other hand, when the SOC is lower than 74% in step S2, the process proceeds to step S3. The predetermined percentage is not limited to, 74%, and may be changed to an appropriate value.

In step S3, it is determined whether a charging power Pchg is 5.5 kW (a predetermined value at which charging is carried out when the SOC is low). When Pchg is not 5.5 kW in step S3, the process proceeds to step S4. When Pchg is 5.5 kW in step S3, the process proceeds to step S5.

In step S4, it is determined whether there is a fluctuation in the engine rotation speed. When there is a fluctuation in the engine rotation speed in step S4, the process proceeds to step S10, and dead time compensation based on inverter output current polarity is employed. On the other hand, when there is no fluctuation in the engine rotation speed in step S4, the process proceeds to step S9, and dead time compensation based on repetition control is employed.

In step S5, it is determined whether there is a change in the carrier frequency of the inverter. When it is determined in step S5 that there is a change in the carrier frequency, the process proceeds to step S10, and dead time compensation based on inverter output current polarity is employed. On the other hand, when there is no change in the carrier frequency in step S5, the process proceeds to step S6.

In step S6, it is determined whether there is a change in the voltage VH that is controlled by the converter 10. When it is determined in step S6 that there is a change in the voltage VH, the process proceeds to step S10, and dead time compensation based on inverter output current polarity is employed. On the other hand, when it is determined in step S6 that there is no change in the voltage VH, the process proceeds to step S7.

In step S7, it is determined whether there is a change in the voltage share k that will be described later with reference to a block diagram. When it is determined in step S7 that there is a change in the voltage share k, the process proceeds to step S10, and dead time compensation based on inverter output current polarity is employed. On the other hand, when it is determined in step S7 that there is no change in the voltage share k, the process proceeds to step S8.

In step S8, it is determined whether there is a fluctuation in the engine rotation speed. When there is a fluctuation in the engine rotation speed in step S8, the process proceeds to step S10, and dead time compensation based on inverter output current polarity is employed. On the other hand, when there is no fluctuation in the engine rotation speed in step S8, the process proceeds to step S9, and dead time compensation based on repetition control is employed.

When it is determined in step S9 or step. S10 that dead time compensation of any one of the modes is executed, the process proceeds to step S11, and control is shifted to the main routine.

In the above-described process, whether there is a fluctuation in the engine rotation speed, whether there is a change in the carrier frequency, whether there is a change in the voltage VH and whether there is a change in the voltage share k each may be determined that there is no fluctuation or no change when a fluctuation amount or change amount is smaller than a predetermined threshold.

Dead Time Error Compensation During Engine Stop

Figure 9:
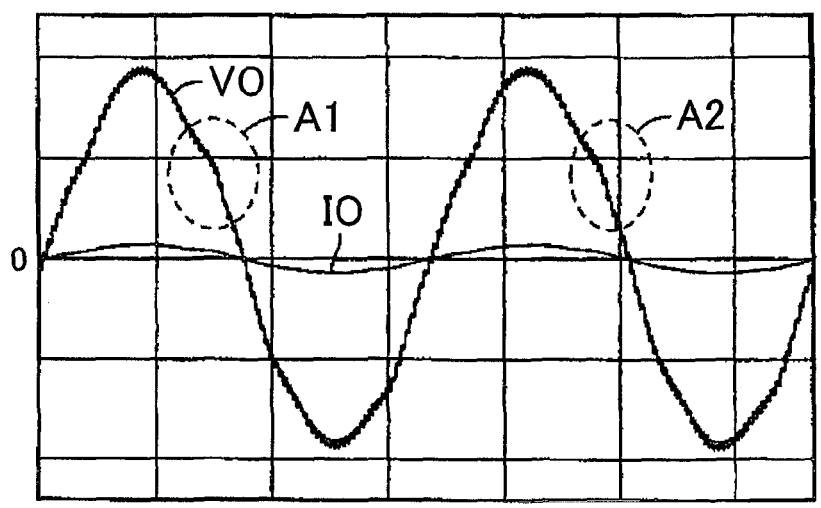
FIG. 9 is a waveform chart for illustrating a distortion of a power supply waveform due to an error that occurs in a dead time period during engine stop.

FIG. 9 is a waveform chart for illustrating a distortion of a power supply waveform due to an error that occurs in a dead time period during engine stop. As shown in FIG. 9, a neutral point output voltage VO and a neutral point output current JO are shown. During engine stop, a dead time error is the same in each period, so there is the same distortion at dashed-line portions A1, A2 of the neutral point output voltage VO.

Figure 10:
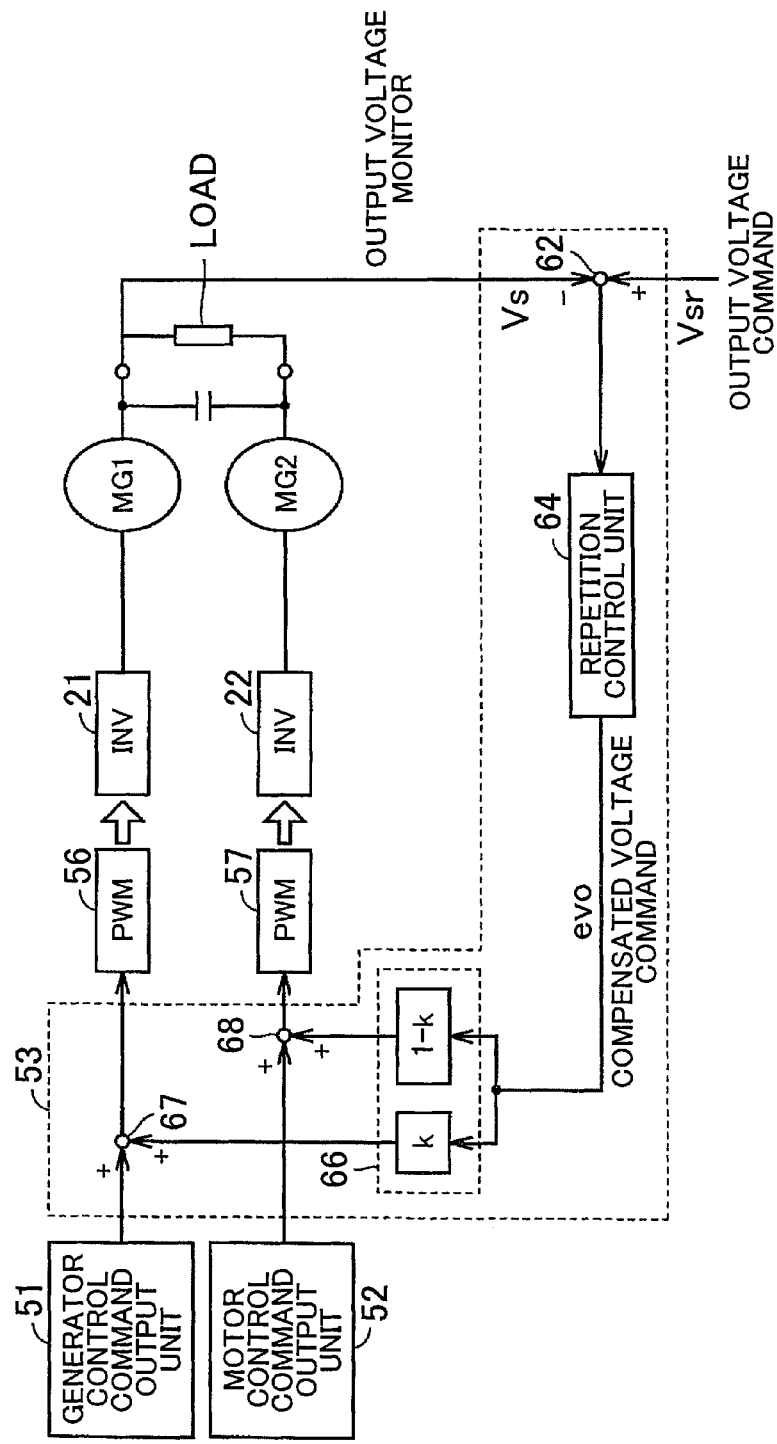
FIG. 10 is a block diagram that shows the configuration of a dead time compensation control unit when repetition control is executed.

FIG. 10 is a block diagram that shows the configuration of the dead time compensation control unit 53 when repetition control is executed. As shown in FIG. 10, the dead time compensation control unit 53 includes a subtracter 62, a repetition control unit 64 and a share determination unit 66. The subtracter 62 computes a difference between an output voltage command value Vsr and an output voltage monitored value Vs. The repetition control unit 64 receives an output of the subtracter 62. The share determination unit 66 generates an output corresponding to the voltage share between the inverter 21 and the inverter 22 on the basis of the voltage share k upon reception of an output of the repetition control unit 64.

The dead time compensation control unit 53 further includes an adder 67 and an adder 68. The adder 67 adds the output (k) of the share determination unit 66 and the output of the generator control command output unit 51 and then outputs the added result to the PWM control unit 56. The adder 68 adds the output (1−k) of the share determination unit 66 and the output of the motor control command output unit 52, and then outputs the added result to the PWM control unit 56.

Figure 11:
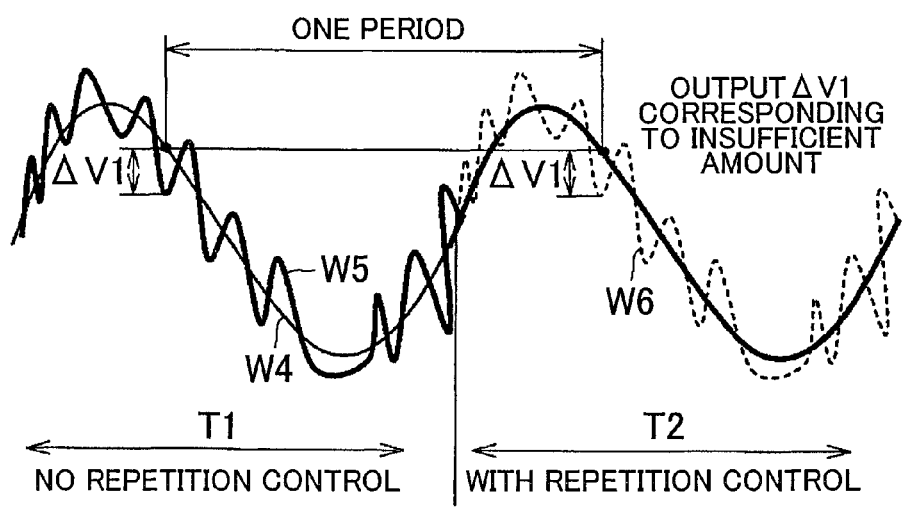
FIG. 11 is a view for illustrating a difference in waveform between before and after repetition control is executed.

FIG. 11 is a view for illustrating a difference in waveform between before and after repetition control is executed. As shown in FIG. 11, a waveform with no repetition control is shown in a period T1, and a waveform with repetition control is shown in a period T2. In the period T1, there is a deviation ΔV1 in an output value W5 with respect to a command value W4.

In contrast, in the period T2, an output as indicated by the dashed line W6 should be output without repetition control; however, owing to application of repetition control, the stored deviation ΔV1 one period before is corrected, and the neutral point output voltage W5 coincides with the command value W4.

The principle of repetition control is to store an output deviation one period before for an output error that occurs in each period and then to compensate for the command value. Hereinafter, repetition control will be more specifically described.

Figure 12:
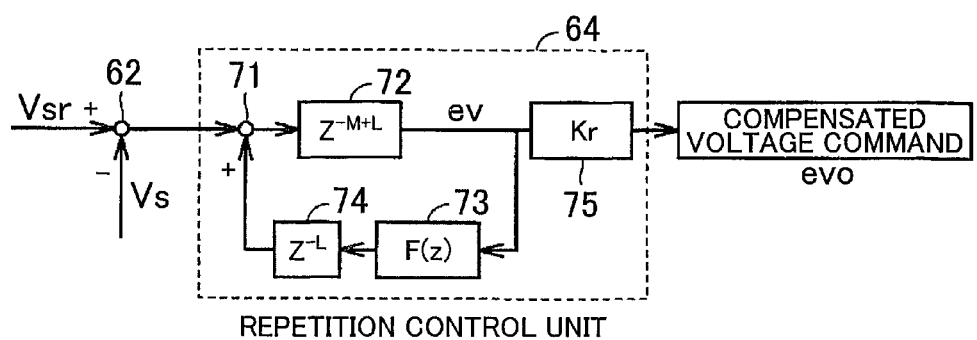
FIG. 12 is a block diagram for illustrating the configuration of a repetition control unit shown in FIG. 10.

FIG. 12 is a block diagram for illustrating the configuration of the repetition control unit 64 shown in FIG. 10. As shown in FIG. 12, the repetition control unit 64 includes an adder 71 and blocks 72 to 75.

The adder 71 adds the differential value between the neutral point voltage command value Vsr and the output voltage monitored value Vs, to an output of the block 74. The block 72 stores a voltage deviation V1 of the neutral point voltage output one period before. That is, the block 72 samples and stores M neutral point output commands, and extracts the samples with a delay in phase by the sampling number L corresponding to a delay from an inverter output to a neutral point load voltage.

Figure 13:
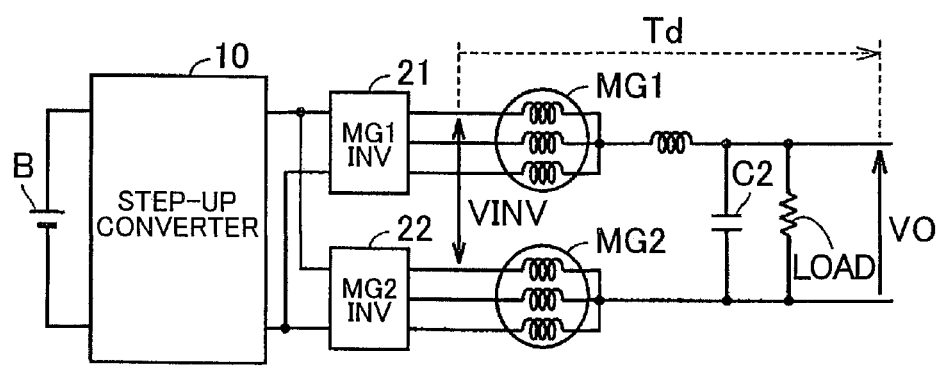
FIG. 13 is a block diagram for illustrating a value L in FIG. 12.
Figure 14:
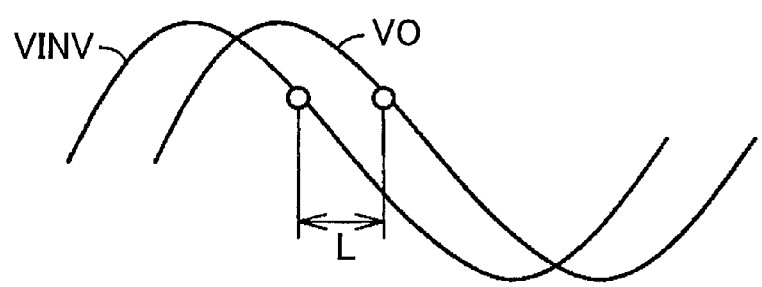
FIG. 14 is a waveform chart for illustrating the value L in FIG. 12.

FIG. 13 is a block diagram for illustrating a value L in FIG. 12. FIG. 14 is a waveform chart for illustrating the value L in FIG. 12. As shown in FIG. 13 and FIG. 14, the output voltage phase of the neutral point output voltage VO is delayed by an LC filter by a delay Td with respect to a voltage VINV just output from the inverter 21. The delay Td corresponds to the sampling number L.

Referring back to FIG. 12, the block 73 removes noise from an output ev of the block 72 through moving average. In the case of n-point sampling, where stored output values ev are ev1 to evn, a moving average value is expressed by (ev1+ev2+ . . . +evn)/n.

The block 74 executes the process of converting an output of the block 73 to an inverter output voltage. Specifically, a sample ev that is earlier in phase by the sampling number L corresponding to a delay in neutral point load voltage from inverter output is extracted.

The block 75 multiplies the output ev by a gain Kr, and then outputs the obtained result as a compensated voltage command value evo.

In the block diagram, F(z) indicates a moving average filter, $Z^{-L}$ indicates a neutral point output (inverter output voltage), and $Z^{M+L}$ indicates a neutral point output (neutral point load voltage) one period before.

Dead Time Error Compensation During Engine Operation

Figure 15:
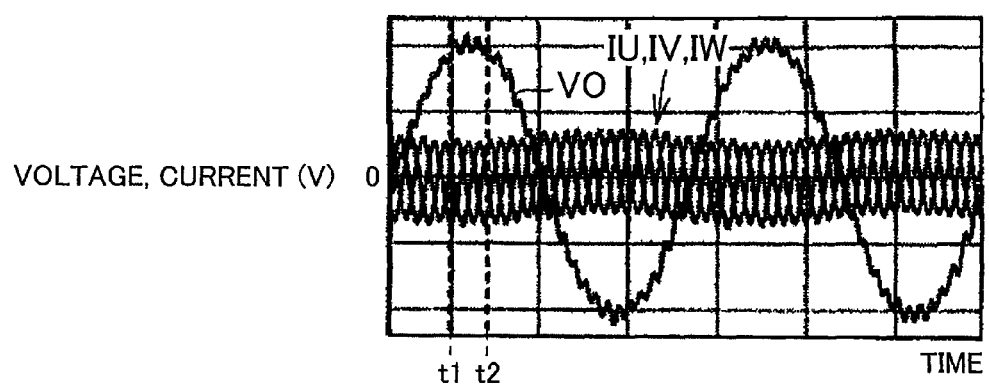
FIG. 15 is a waveform chart that shows an output voltage and inverter currents during engine operation.

FIG. 15 is a waveform chart that shows an output voltage and inverter currents during engine operation. FIG. 15 shows the neutral point output voltage VO and current values IU, IV, IW of U-phase, V-phase, W-phase inverter currents. The inverter current values are directly proportional to the engine rotation speed, and fluctuate in frequency.

Figure 16:
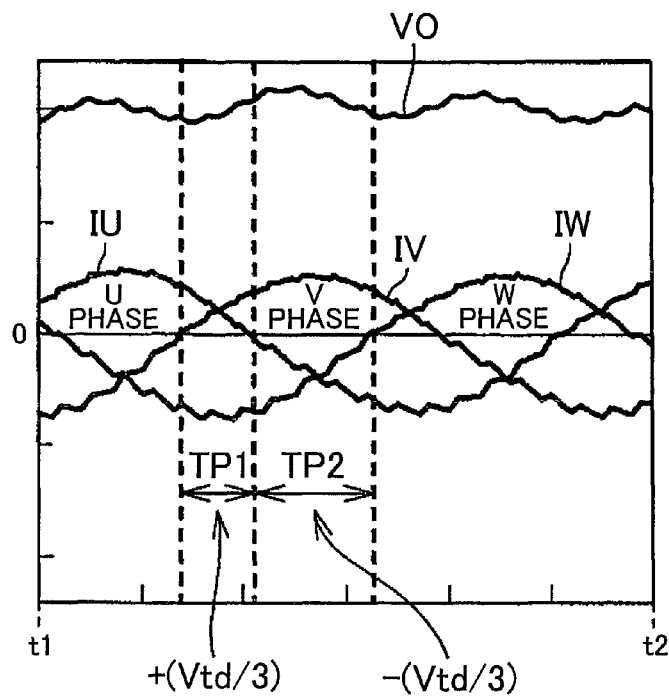
FIG. 16 is an enlarged waveform chart between time t1 and time t2 in FIG. 15.

FIG. 16 is an enlarged waveform chart between time t1 and time t2 in FIG. 15. A pulsation is occurring in the neutral point output voltage VO at a frequency three times as large as that of each inverter current. The voltage at the neutral point fluctuates depending on the polarities of the phase currents. The reason why the fluctuation occurs will be more specifically described.

As shown in FIG. 15 and FIG. 16, a pulsation is occurring in inverter currents. Therefore, each inverter current waveform is not completely symmetric vertically with respect to the line at which current is zero. A period TP1 is a period in which the current IU and the current IV are positive, and the current IW is negative. In the period TP1, the inverter output error voltage is +(Vtd/3). A period TP2 is a period in which the current IV is positive and the current IU and the current IW are negative. In the period TP2, the inverter output error voltage is −(Vtd/3). These inverter output error voltages will be further described.

Figure 17:
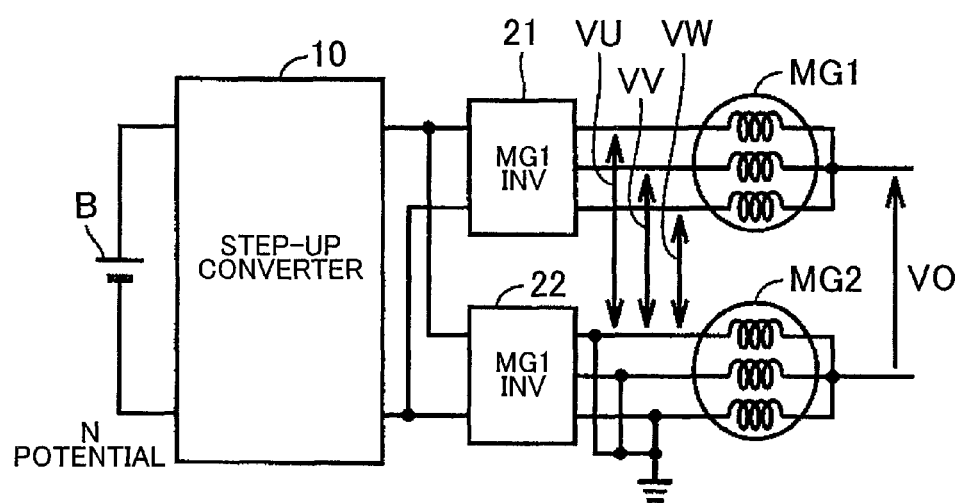
FIG. 17 is a block diagram for illustrating an inverter output error during engine operation.

FIG. 17 is a block diagram for illustrating an inverter output error during engine operation. FIG. 18 shows waveform charts for illustrating an inverter output error during engine operation.

As shown in FIG. 17, for the sake of convenience, the output of the inverter 22 at the motor generator MG2 side is constantly fixed to a potential N.

In the condition i) of FIG. 18, it is assumed that the U-phase output voltage VU, V-phase output voltage VV and W-phase output voltage VW of the inverter 21 all are the voltage VH. The total sum of one third of each of the three-phase outputs is the neutral point output, so the neutral point output is the voltage VH in the condition i).

In the condition ii) of FIG. 18, it is assumed that the U-phase output voltage VU and V-phase output voltage VV of the inverter 21 all are the voltage VH and the W-phase output voltage VW is the potential N. The total sum of one third of each of the three-phase outputs is the neutral point output, so the neutral point output is a voltage ⅔VH in the condition ii).

It is understood that, in a dead time period, in the circuit shown in FIG. 3, the diode D1 is in the forward direction when the direction of current is +Ia and Vao having a value of VH is output; whereas the diode D4 is in the forward direction when the direction of current is −Ia and Vao having a value of N is output.

Referring back to FIG. 16, in the period TP1, the two-phase current polarities are positive, and the remaining one-phase current polarity is negative. An output error in the case where the current polarity is positive is +Vtd, and an output error in the case where the current polarity is negative is −Vtd. As described with reference to FIG. 17 and FIG. 18, the neutral point output is the total sum of one third of each of the three-phase output voltages, so an error of the neutral point output is also similarly calculated, and a neutral point output error Ve(TP1) in the period TP1 is expressed by the following mathematical expression (2).

$$Ve(TP1) = \frac{1}{3} \times (+Vtd) + \frac{1}{3} \times (+Vtd) + \frac{1}{3} \times (-Vtd)$$

$$Ve(TP1) = \frac{1}{3} \times (+Vtd) \quad (2)$$

In the period TP2, the two-phase current polarities are negative, and the remaining one-phase current polarity is positive. When considered as in the case of the above, a neutral point output error Ve(TP2) in the period TP2 is expressed by the following mathematical expression (3).

$$Ve(TP2) = \frac{1}{3} \times (-Vtd) + \frac{1}{3} \times (-Vtd) + \frac{1}{3} \times (+Vtd)$$

$$Ve(TP2) = \frac{1}{3} \times (-Vtd) \quad (3)$$

From the correlation between a current polarity and a dead time error as described above, it is effective to execute compensation control based on current polarity during engine operation in which the repeating period is not stable.

FIG. 19 is a block diagram that shows the configuration of the dead time compensation control unit 54 when compensation control based on current polarity is executed.

As shown in FIG. 19, the dead time compensation control unit 54 includes a subtracter 81, a voltage control unit 82, a dead time compensation unit 83, adders 84, 85, 87, 88 and a share determination unit 86. The subtracter 81 computes a difference between the output voltage command value Vsr and the output voltage monitored value Vs. The voltage control unit 82 receives an output of the subtracter 81. The dead time compensation unit 83 outputs a compensation value on the basis of phase currents that are output from the inverters 21, 22 to the motor generators.

The dead time compensation unit 83 includes a dead time compensation unit 91 and a dead time compensation unit 92. The dead time compensation unit 91 outputs a compensation value to the adder 85 in response to phase currents igu, igv, igw that are output from the inverter 21 to the motor generator MG1. The dead time compensation unit 92 outputs a compensation value to the adder 84 in response to phase currents imu, imv, imw that are output from the inverter 22 to the motor generator MG2.

The adder 84 outputs the result, obtained by adding the output of the voltage control unit 82 to the output of the dead time compensation unit 92, to the share determination unit 86. The adder 85 outputs the result, obtained by adding the output of the voltage control unit 82 to the output of the dead time compensation unit 91, to the share determination unit 86.

The share determination unit 86 multiplies the output of the adder 85 by the share k and then outputs the obtained result to the adder 87. The adder 87 adds the value that is provided from the share determination unit 86 to the output of the generator control command output unit 51 and then outputs the obtained result to the PWM control unit 56. The share determination unit 86 multiplies the output of the adder 84 by (1−k) and then outputs the obtained result to the adder 88. The adder 88 adds the value that is provided from the share determination unit 86 to the output of the motor control command output unit 52 and then outputs the obtained result to the PWM control unit 57.

Figure 20:
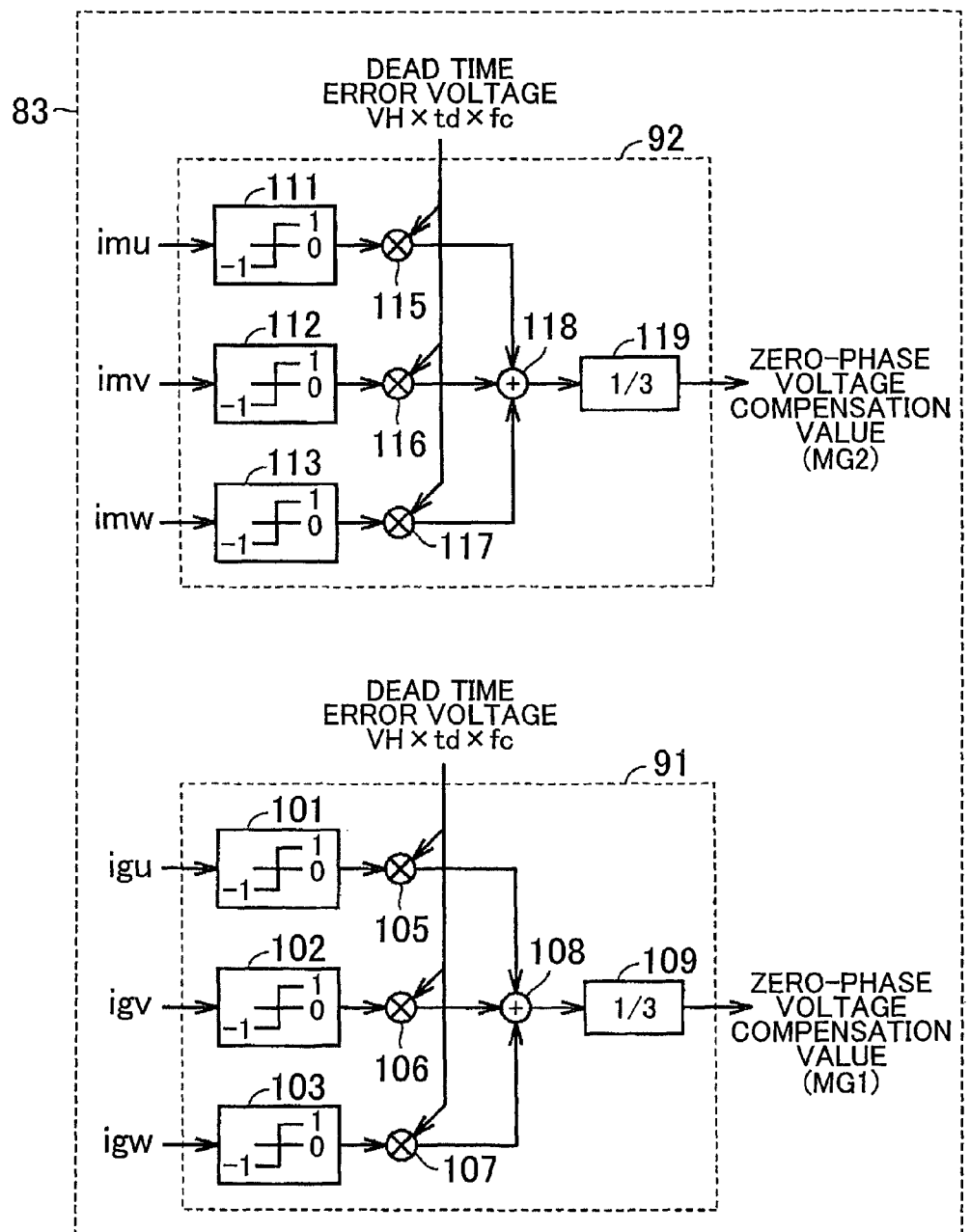
FIG. 20 is a block diagram that shows the configuration of a dead time compensation unit shown in FIG. 19.

FIG. 20 is a block diagram that shows the configuration of the dead time compensation unit 83 shown in FIG. 19. As shown in FIG. 20, the dead time compensation unit 83 includes the dead time compensation unit 91 and the dead time compensation unit 92. The dead time compensation unit 91 carries out compensation associated with the motor generator MG1. The dead time compensation unit 92 carries out compensation associated with the motor generator MG2.

The dead time compensation unit 91 includes comparators 101 to 103, multipliers 105 to 107, an adder 108 and a coefficient multiplier 109. The comparators 101 to 103 respectively compare the phase currents igu, igv, igw with zero. The multipliers 105 to 107 respectively multiply the outputs of the comparators 101 to 103 by the dead time error voltage Vtd (=VH×td×fc). The adder 108 computes the total sum of the outputs of the multipliers 105 to 107. The coefficient multiplier 109 multiplies the output of the adder 108 by a coefficient that is ⅓. The output of the coefficient multiplier 109 is input to the adder 85 shown in FIG. 19 as a voltage compensation value for the motor generator MG1.

The dead time compensation unit 92 includes comparators 111 to 113, multipliers 115 to 117, an adder 118 and a coefficient multiplier 119. The comparators 111 to 113 respectively compare phase currents imu, imv, imw with zero. The multipliers 115 to 117 respectively multiply the outputs of the comparators 111 to 113 by the dead time error voltage Vtd (=VH×td×fc). The adder 118 computes the total sum of the outputs of the multipliers 115 to 117. The coefficient multiplier 119 multiplies the output of the adder 118 by a coefficient that is ⅓. The output of the coefficient multiplier 119 is input to the adder 84 shown in FIG. 19 as a voltage compensation value for the motor generator MG2.

In the first embodiment, dead time compensation control based on repetition control, which is particularly effective to compensate for a stable and periodical error, and control based on current polarity, which is effective to compensate for an error of which the period fluctuates during engine operation, are combined with each other. Thus, it is possible to prevent occurrence of a significant error in voltage that is output from the neutral points.

Second Embodiment

In the first embodiment, in order to compensate for an error of output voltage during engine operation, or the like, control that is executed on the basis of the polarities of inverter currents is applied. However, when the current polarities change at a high rate, a control delay influences on compensation for voltage if control is executed after the current polarities are determined each time.

Figure 21:
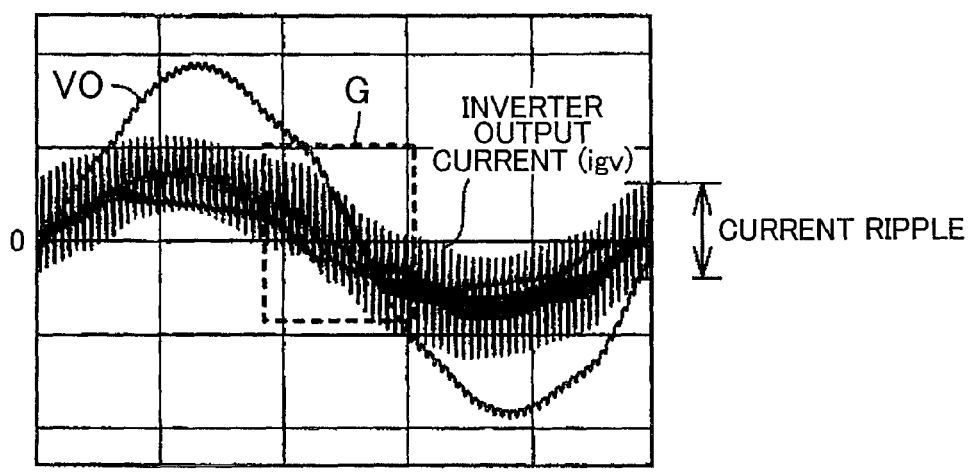
FIG. 21 is a waveform chart that shows an example in which current ripple is strong and a current polarity fluctuates at a high rate.

FIG. 21 is a waveform chart that shows an example in which current ripple is strong and the current polarity fluctuates at a high rate. FIG. 21 shows a neutral point output voltage VO and an inverter output current igv. In a portion surrounded by the dashed line G, current varies while crossing zero, and repeatedly inverts its polarity from positive to negative or negative to positive at a high rate. In such a case, it is difficult to execute feedback control over the current polarity. In a second embodiment, instead of carrying out current polarity determination on the basis of the output of the current sensor, the current polarities are determined on the basis of the rotation angle of the motor generator MG1.

Figure 22:
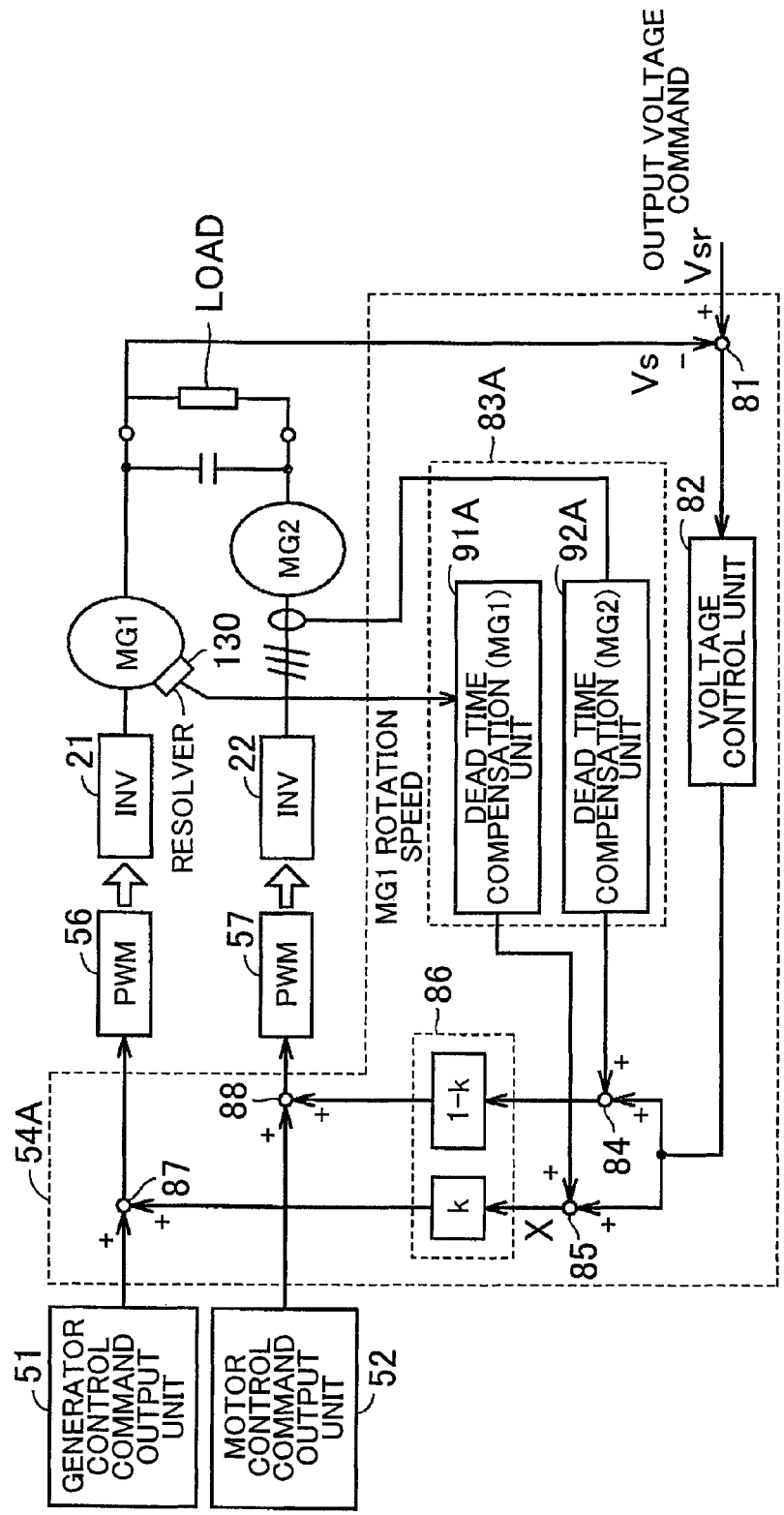
FIG. 22 is a block diagram of a dead time compensation control unit that executes compensation control based on current polarity determination that utilizes a rotation angle of an MG1.

FIG. 22 is a block diagram of a dead time compensation control unit 54A that executes compensation control based on current polarity determination that utilizes the rotation angle of the MG1.

As shown in FIG. 22, the dead time compensation control unit 54A includes the subtracter 81, the voltage control unit 82, a dead time compensation unit 83A, adders 84, 85, 87, 88 and a share determination unit 86. The subtracter 81 computes a difference between the output voltage command value Vsr and the output voltage monitored value Vs. The voltage control unit 82 receives an output of the subtracter 81. The dead time compensation unit 83A outputs a compensation value on the basis of an output of a resolver 130 that detects the rotation angle of the motor generator MG1 and phase currents that are output from the inverter 22 to the motor generator MG2.

The dead time compensation unit 83 includes a dead time compensation unit 91A and the dead time compensation unit 92. The dead time compensation unit 91A outputs a compensation value to the adder 85 in response to the rotation angle of the motor generator MG1, detected by the resolver 130. The dead time compensation unit 92 outputs a compensation value to the adder 84 in response to the phase currents imu, imv, imw that are output from the inverter 22 to the motor generator MG2.

The adder 84 outputs the result, obtained by adding the output of the voltage control unit 82 to the output of the dead time compensation unit 92, to the share determination unit 86. The adder 85 outputs the result, obtained by adding the output of the voltage control unit 82 to the output of the dead time compensation unit 91A, to the share determination unit 86.

The share determination unit 86 multiplies the output of the adder 85 by the share k and then outputs the obtained result to the adder 87. The adder 87 adds the value that is provided from the share determination unit 86 to the output of the generator control command output unit 51 and then outputs the obtained result to the PWM control unit 56. The share determination unit 86 multiplies the output of the adder 84 by (1−k) and then outputs the obtained result to the adder 88. The adder 88 adds the value that is provided from the share determination unit 86 to the output of the motor control command output unit 52 and then outputs the obtained result to the PWM control unit 57.

As shown in FIG. 22, it is possible to acquire the rotation angle of the motor generator MG1 from the resolver 130 and then add correction values for correcting voltage errors to the command values as in the case where the polarities of inverter currents are determined. Because the vehicle is stopped when the motor generator MG2 supplies electric power, inverter currents are locked currents (DC currents) and the current polarities are fixed, so it is possible to carry out dead time compensation by monitoring the current polarities with the use of the dead time compensation unit 92 as in the case of the first embodiment.

Figure 23:
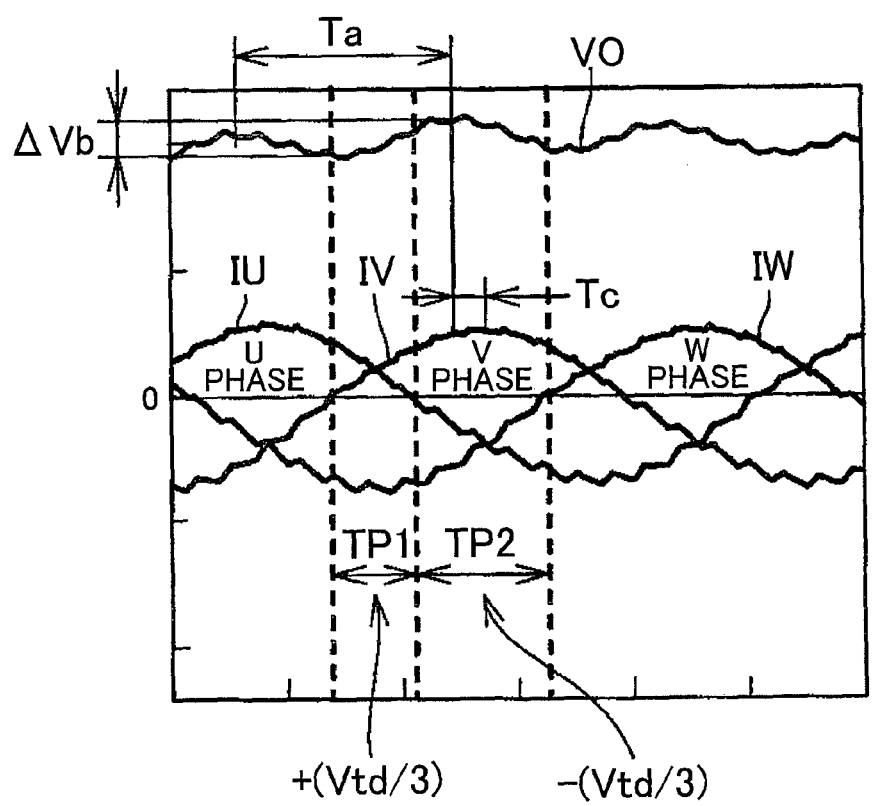
FIG. 23 is a waveform chart for illustrating calculation of an inverter error voltage, which utilizes the rotation angle of the MG1.

FIG. 23 is a waveform chart for illustrating calculation of an inverter error voltage, which utilizes the rotation angle of the MG1. As shown in FIG. 23, an interval (period) Ta of the peak value of the harmonic of the neutral point output voltage, a temporal difference Tc between the peak of each inverter phase current and the peak of the harmonic of the neutral point output voltage, and an effective value ΔVb of a harmonic voltage are used for compensation.

When the current polarities of inverter outputs vary at a high rate, the process of detecting a phase difference between the harmonic of the neutral point output and the V-phase current of the motor generator MG1, which is slower in computation speed than the variation in current polarities, is executed. When the periods TP1, TP2 of FIG. 23 are defined from the detected phase difference and then correction values +(Vtd/3), −(Vtd/3) are applied, it is possible to execute a process substantially equivalent to compensation for a dead time error voltage on the basis of the polarities of inverter currents.

Figure 24:
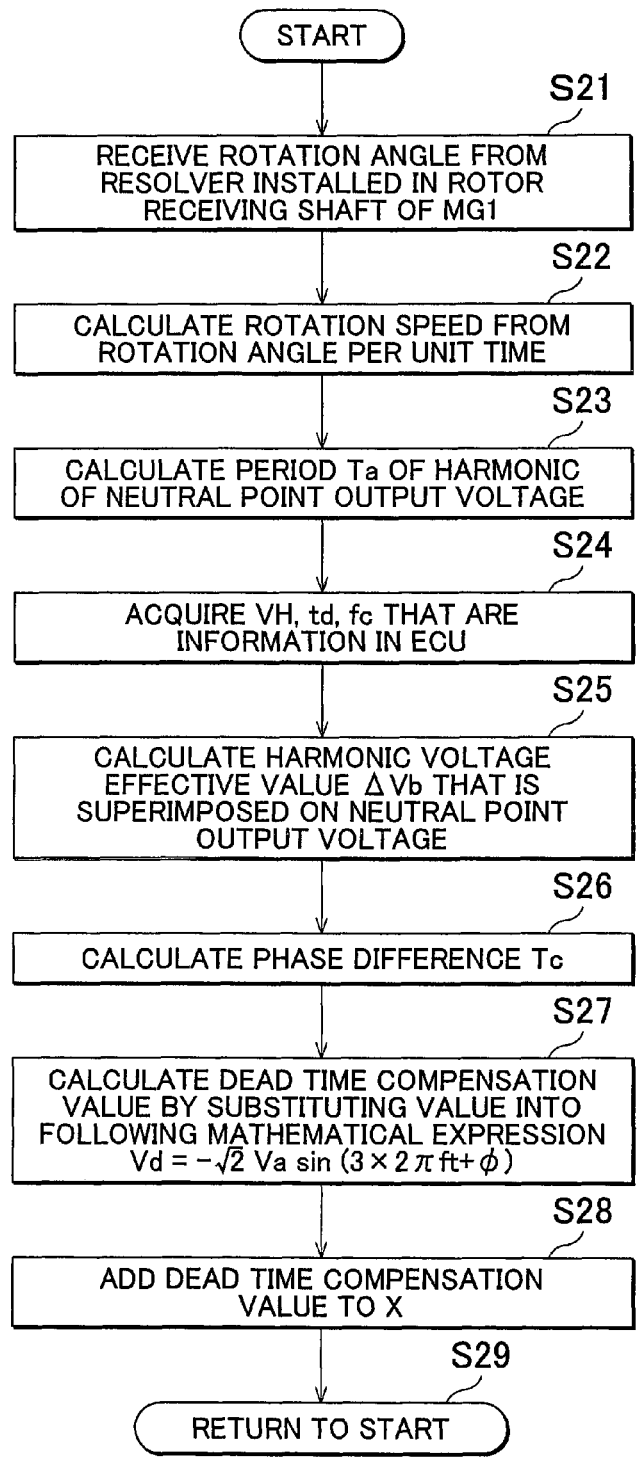
FIG. 24 is a flowchart for illustrating the process of calculating a compensation value, which is executed by a dead time compensation unit in FIG. 22.

FIG. 24 is a flowchart for illustrating the process of calculating a compensation value, which is executed by the dead time compensation unit 91A shown in FIG. 22. As shown in FIG. 24, initially, when the process is started, a rotation angle is received from the resolver 130 installed in a rotor receiving shaft of the motor generator MG1 in step S21. Subsequently, in step S22, a rotation speed is calculated from a rotation angle per unit time.

In step S23, the period Ta of the neutral point output voltage harmonic is calculated. The period Ta is calculated through the process of FIG. 25 described later. An electric-angle frequency of the motor generator MG1 is three times as high as the harmonic frequency that occurs in neutral point electric power. When the motor generator MG1 is an 8-pole PM motor, the electric-angle frequency of the motor generator MG1 is four times as high as the rotation speed of the motor generator MG1.

After that, in step S24, the voltage VH, the dead time td and the carrier frequency fc, which are pieces of internal information of an ECU for driving the motor generator MG1, are acquired. In step S25, a voltage effective value of the harmonic, which is superimposed on the neutral point output voltage, is calculated from ΔVb shown in FIG. 23.

In step S26, a phase difference is calculated on the basis of the temporal difference Tc shown in FIG. 23. Calculation of the temporal difference Tc will be described later with reference to FIG. 27 and FIG. 28.

After required information is calculated, a dead time compensation value is calculated in step S27. The dead time compensation value Vd is calculated from the following mathematical expression (4).

$$Vd = \sqrt{2} \cdot Va \cdot \sin(3 \times 2\pi ft + \phi) \quad (4)$$

Here, Va denotes the amplitude of the harmonic of the neutral point output voltage, f denotes the electric-angle frequency of MG1 current, φ denotes a value obtained from a phase difference between the harmonic of the neutral point output voltage and the MG1 current, and t denotes time.

Furthermore, in step S28, the dead time compensation value Vd calculated in step S27 is provided to the adder 85 shown in FIG. 22, and is added to the value from the voltage control unit 82.

When the process of step S28 ends, the process returns to the start again in step S29, and the process of the flowchart shown in FIG. 24 is repeated.

Figure 25A:
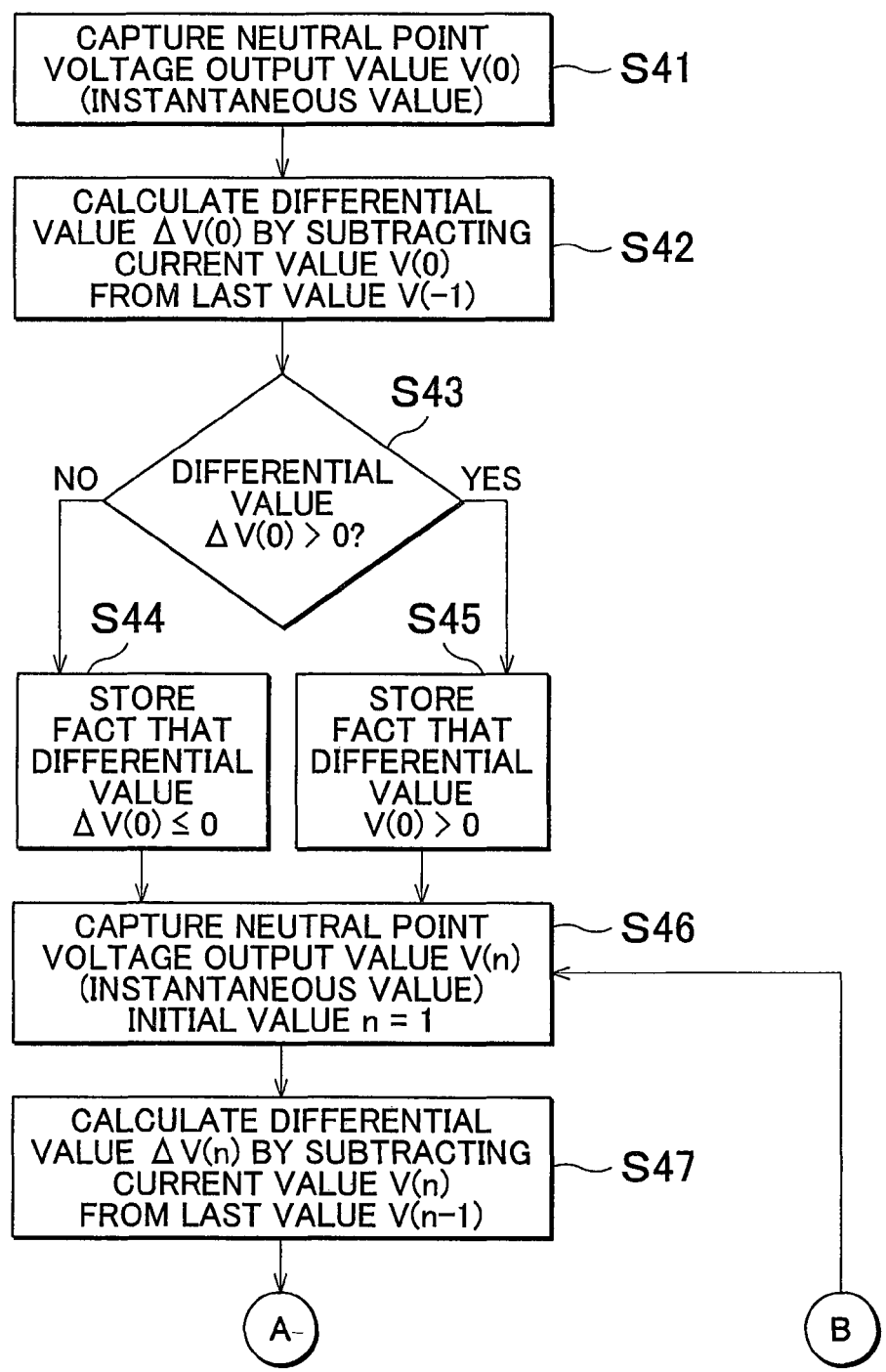
FIG. 25 is a flowchart for illustrating calculation of a peak value of a harmonic that occurs in a neutral point output voltage.
Figure 25B:
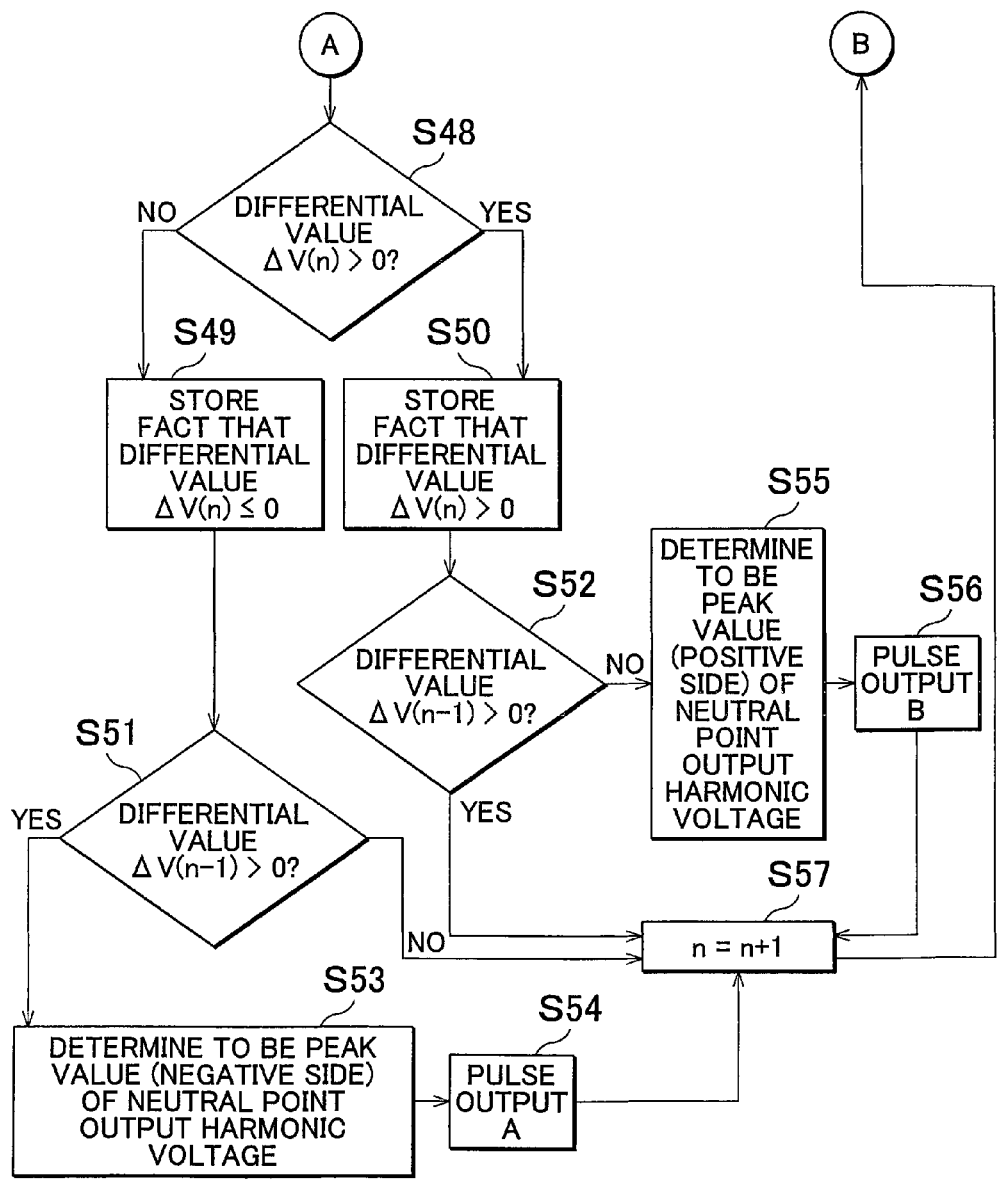

FIG. 25 is a flowchart for illustrating calculation of the peak value of the harmonic that occurs in the neutral point output voltage. The result of the process is used in step S23 of FIG. 24.

As shown in FIG. 25, initially, in step S41, the process of capturing a neutral point voltage output V(0) (instantaneous value) is executed. In step S42, the process of calculating ΔV(0) that is a differential value between a last value V(−1) and the current value V(0) is executed.

In step S43, it is determined whether the calculated differential value ΔV(0) is larger than 0. When the relationship ΔV(0)>0 is not satisfied in step S43, the process proceeds to step S44, and the fact that the differential value ΔV(0) is zero or negative is stored in a memory. On the other hand, when the relationship ΔV(0)>0 is satisfied in step S43, the process proceeds to step S45, and the fact that the differential value ΔV(0) is positive is stored in the memory. The storage content may be, for example, configured such that a predetermined flag corresponds to 0 or 1.

Subsequent to the process of step S44 or S45, in step S46, the process of capturing a neutral point voltage output V(n) (instantaneous value) is executed. Here, the initial value of n is set to 1. In step S47, the process of calculating ΔV(n) that is a differential value between a last value V(n−1) and the current value V(n) is executed.

In step S48, it is determined whether the calculated differential value ΔV(n) is larger than 0. When the relationship ΔV(n)>0 is not satisfied in step S48, the process proceeds to step S49, and the fact that the differential value ΔV(n) is zero or negative is stored in the memory. On the other hand, when the relationship ΔV(n)>0 is satisfied in step S48, the process proceeds to step S50, and the fact that the differential value ΔV(n) is positive is stored in the memory. The storage content may be, for example, configured such that a predetermined flag corresponds to 0 or 1.

When the process of step S49 is executed, it is subsequently determined in step S51 whether the last differential value ΔV(n−1) is positive. When the differential value ΔV(n−1) is positive, the process proceeds to step S53. When the differential value ΔV(n−1) is zero or negative, the process proceeds to step S57.

It is determined in step S53 that the output value V(n) at that timing is the peak value (negative side) of the harmonic voltage of the neutral point output, a pulse output A is output in step S54, and then the process proceeds to step S57.

On the other hand, when the process of step S50 is executed, it is subsequently determined in step S52 whether the last differential value ΔV(n−1) is positive. When the differential value ΔV(n−1) is positive, the process proceeds to step S57. When the differential value ΔV(n−1) is zero or negative, the process proceeds to step S55.

It is determined in step S55 that the output value V(n) at that timing is the peak value (positive side) of the harmonic voltage of the neutral point output, a pulse output B is output in step S56, and then the process proceeds to step S57.

In step S57, the variable n is added with 1, and then the process of step S46 is executed again.

In this way, variations in neutral point electric power output value are repeatedly observed, and a pulse output is output each time a peak is detected.

Subsequently, the process of calculating the current peak value of the motor generator MG1 will be described. This process is also basically the process of detecting a peak by observing variations in current as in the case of the process shown in FIG. 25.

Figure 26A:
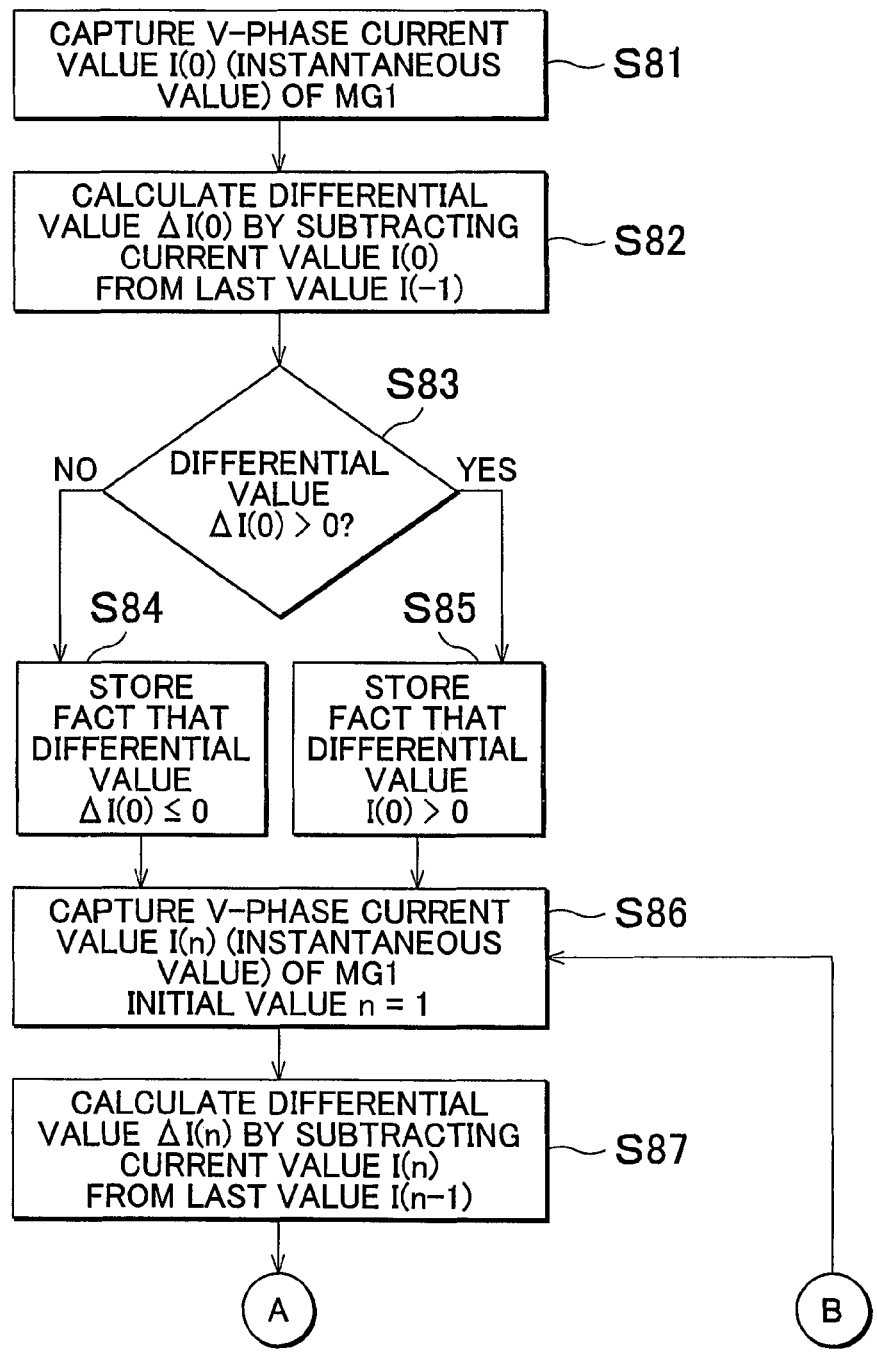
FIG. 26 is a flowchart for illustrating calculation of a peak value of a current of the motor generator MG1.
Figure 26B:
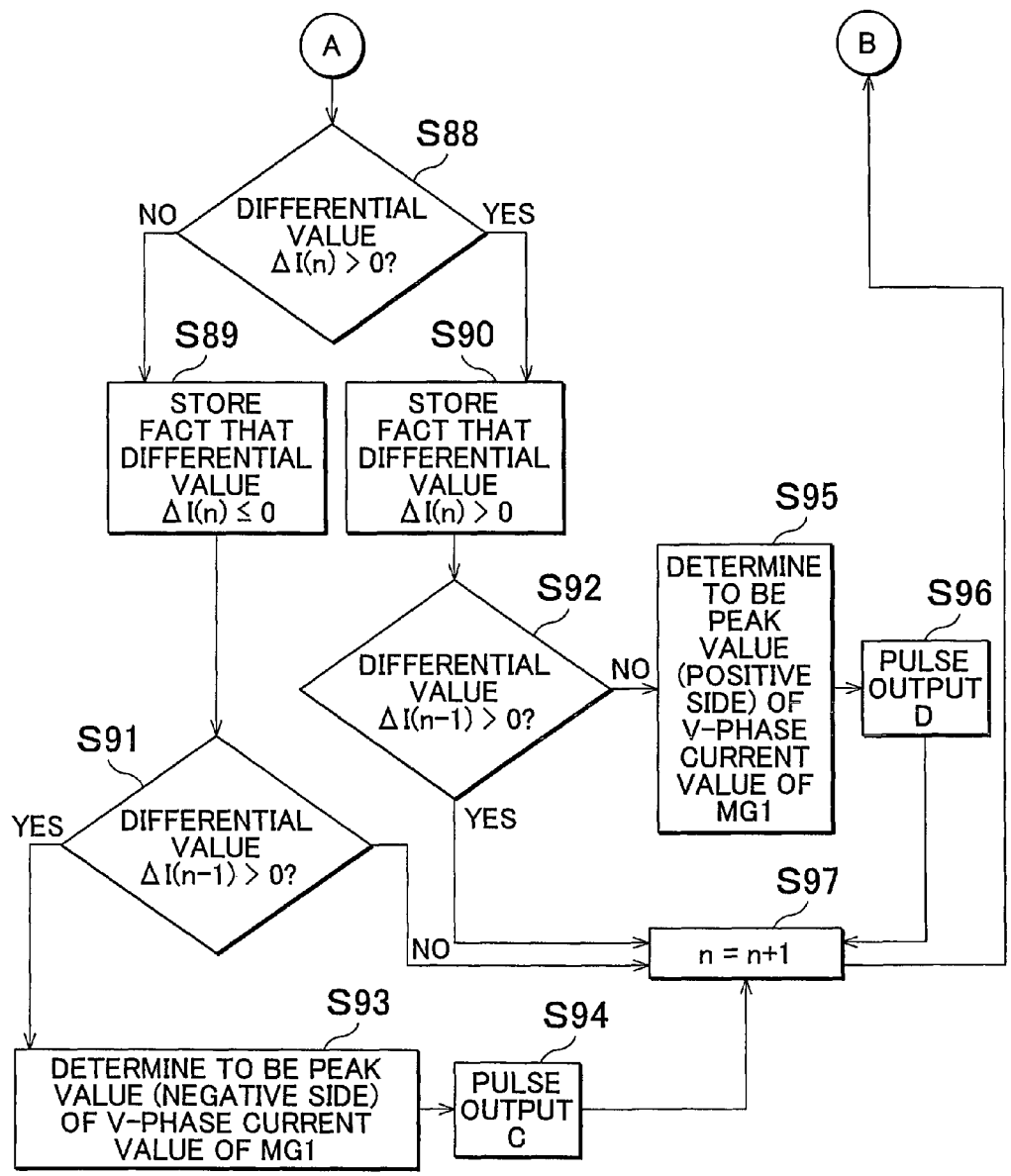

FIG. 26 is a flowchart for illustrating calculation of the current peak value of the motor generator MG1. As shown in FIG. 26, initially, in step S81, the process of capturing a V-phase current value I(0) (instantaneous value) of the motor generator MG1 is executed. In step S82, the process of calculating ΔI(0) that is a differential value between the last value I(−1) and the current value I(0) is executed.

In step S83, it is determined whether the calculated differential value ΔI(0) is smaller than 0. When the relationship ΔI(0)>0 is not satisfied in step S83, the process proceeds to step S84, and the fact that the differential value ΔI(0) is zero or negative is stored in the memory. On the other hand, when the relationship that ΔI(0)>0 is satisfied in step S83, the process proceeds to step S85, and the fact that the differential value ΔI(0) is positive is stored in the memory. The storage content may be, for example, configured such that a predetermined flag corresponds to 0 or 1.

Subsequent to the process of step S84 or step S85, in step S86, the process of capturing a V-phase current value I(n) (instantaneous value) of the motor generator MG1 is executed. Here, the initial value of n is set to 1. In step S87, the process of calculating ΔI(n) that is a differential value between the last value I(n−1) and the current value I(n) is executed.

In step S88, it is determined whether the calculated differential value ΔI(n) is larger than 0. When the relationship that ΔI(n)>0 is not satisfied in step S88, the process proceeds to step S89, and the fact that the differential value ΔI(n) is zero or negative is stored in the memory. On the other hand, when the relationship that ΔI(n)>0 is satisfied in step S88, the process proceeds to step S90, and the fact that the differential value ΔI(n) is positive is stored in the memory. The storage content may be, for example, configured such that a predetermined flag corresponds to 0 or 1.

When the process of step S89 is executed, it is subsequently determined in step S91 whether the last differential value ΔI(n−1) is positive. When the differential value ΔI(n−1) is positive, the process proceeds to step S93. When the differential value ΔI(n−1) is zero or negative, the process proceeds to step S97.

It is determined in step S93 that the output value I(n) at that timing is the peak value (negative side) of the V-phase current value of the motor generator MG1, a pulse output C is output in step S94, and then the process proceeds to step S97.

On the other hand, when the process of step S90 is executed, it is subsequently determined in step S92 whether the last differential value ΔI(n−1) is positive. When the differential value ΔI(n−1) is positive, the process proceeds to step S97. When the differential value ΔI(n−1) is zero or negative, the process proceeds to step S95.

It is determined in step S95 that the output value I(n) at that timing is the peak value (positive side) of the V-phase current value of the motor generator MG1, a pulse output D is output in step S96, and then the process proceeds to step S97.

In step S97, the variable n is added with 1, and then the process of step S86 is executed again.

In this way, variations in the V-phase current value of the motor generator MG1 are repeatedly observed, and a pulse output is output each time a peak is detected.

Figure 27:
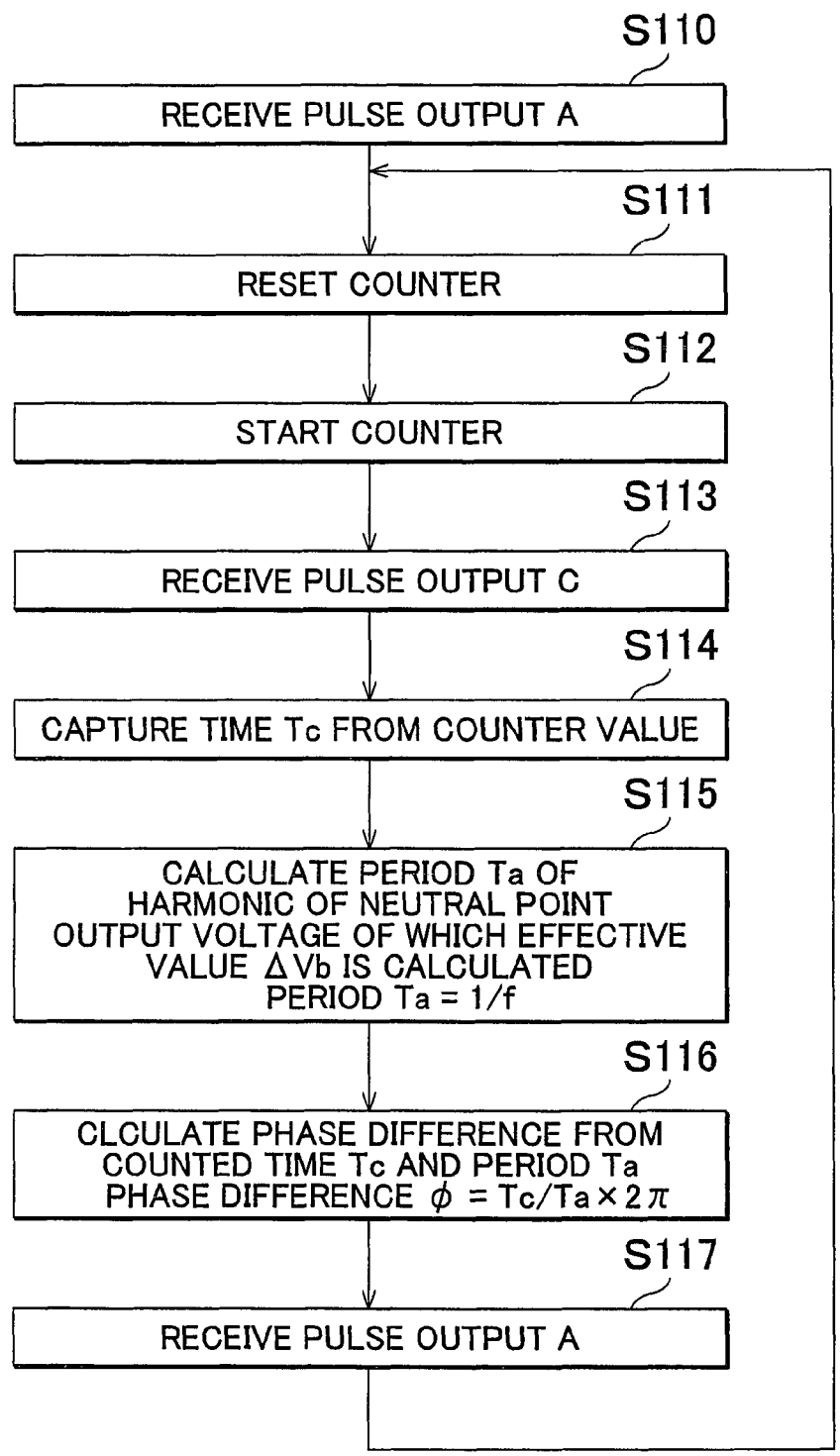
FIG. 27 is a flowchart for illustrating determination of a phase difference between the peak value of the harmonic and the peak value of the current.

FIG. 27 is a flowchart for illustrating determination of a phase difference between a peak value of the harmonic and the peak value of the current. The process of the flowchart is executed in parallel with FIG. 25 (pulse A is output) and FIG. 26 (pulse C is output).

As shown in FIG. 27, initially, when the pulse output A is received in step S110, a timer counter (not shown) in the ECU is reset in step S111. Subsequently, counting of the timer counter is started in step S112.

After that, when the pulse output C is received in step S113, a counter value counted up until this timing is captured in step S114, and a time Tc (FIG. 23) is calculated on the basis of the captured counter value.

In step S115, the period (Ta in FIG. 23) of the harmonic of the neutral point output voltage of which the effective value ΔVb is calculated is calculated. In addition, in step S116, a phase difference φ is calculated from the following mathematical expression (5) by using the counted time Tc and the period Ta.

$$\varphi = Tc \times 2\pi / Ta \quad (5)$$

When the phase difference φ is calculated in step S116, the pulse output A is received in step S117 again, and counter resetting and counting up from step S111 are repeated.

Figure 28:
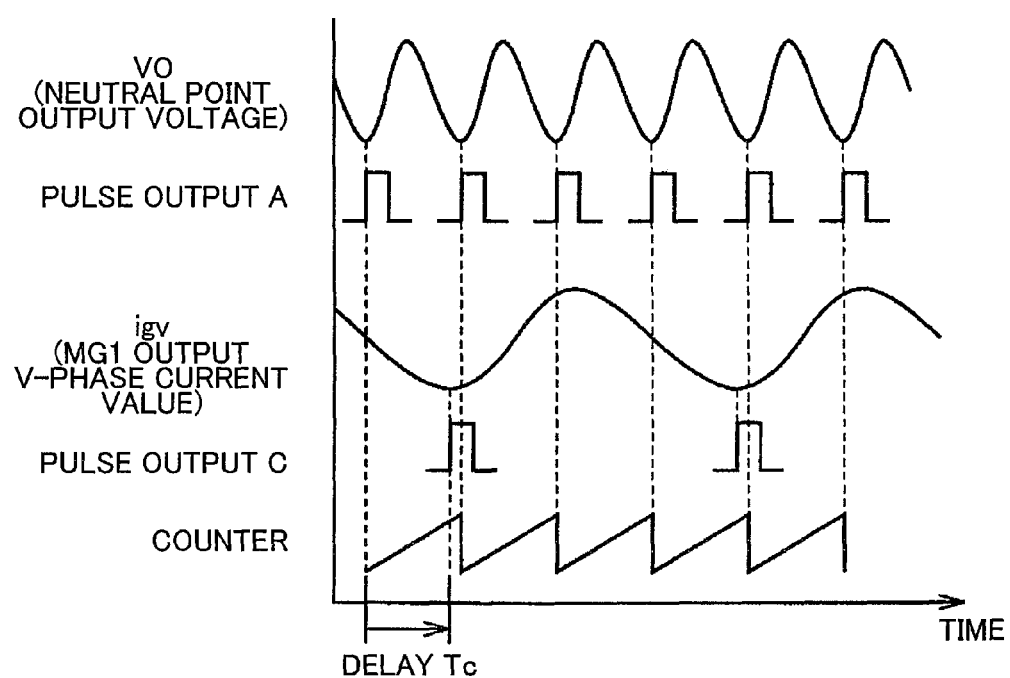
FIG. 28 is a waveform chart for illustrating the process of detecting a phase difference between the peak value of the harmonic and the peak value of the current.

FIG. 28 is a waveform chart for illustrating the process of detecting the phase difference between the peak value of the harmonic and the peak value of the inverter current.

As shown in FIG. 28, when the pulse A is output at the local minimum value of the neutral point output voltage, the counter is reset to zero accordingly, and then counting up is started. When the pulse C is output at the local minimum value of the V-phase current of the motor generator MG1, the time Tc is acquired accordingly. The above-described process is executed in the flowchart of FIG. 27.

As described above, in the second embodiment, when the current polarities of the inverter outputs vary at a high rate, the process of detecting the phase difference between the harmonic of the neutral point output and the V-phase current of the motor generator MG1, which is slower in computation speed than the variation in current polarities, is executed. The periods TP1, TP2 in FIG. 23 are defined from the detected phase difference, and substantially a process equivalent to compensation for the dead time error voltage from the polarities of the inverter currents is possible.

First Alternative Embodiment

Figure 29:
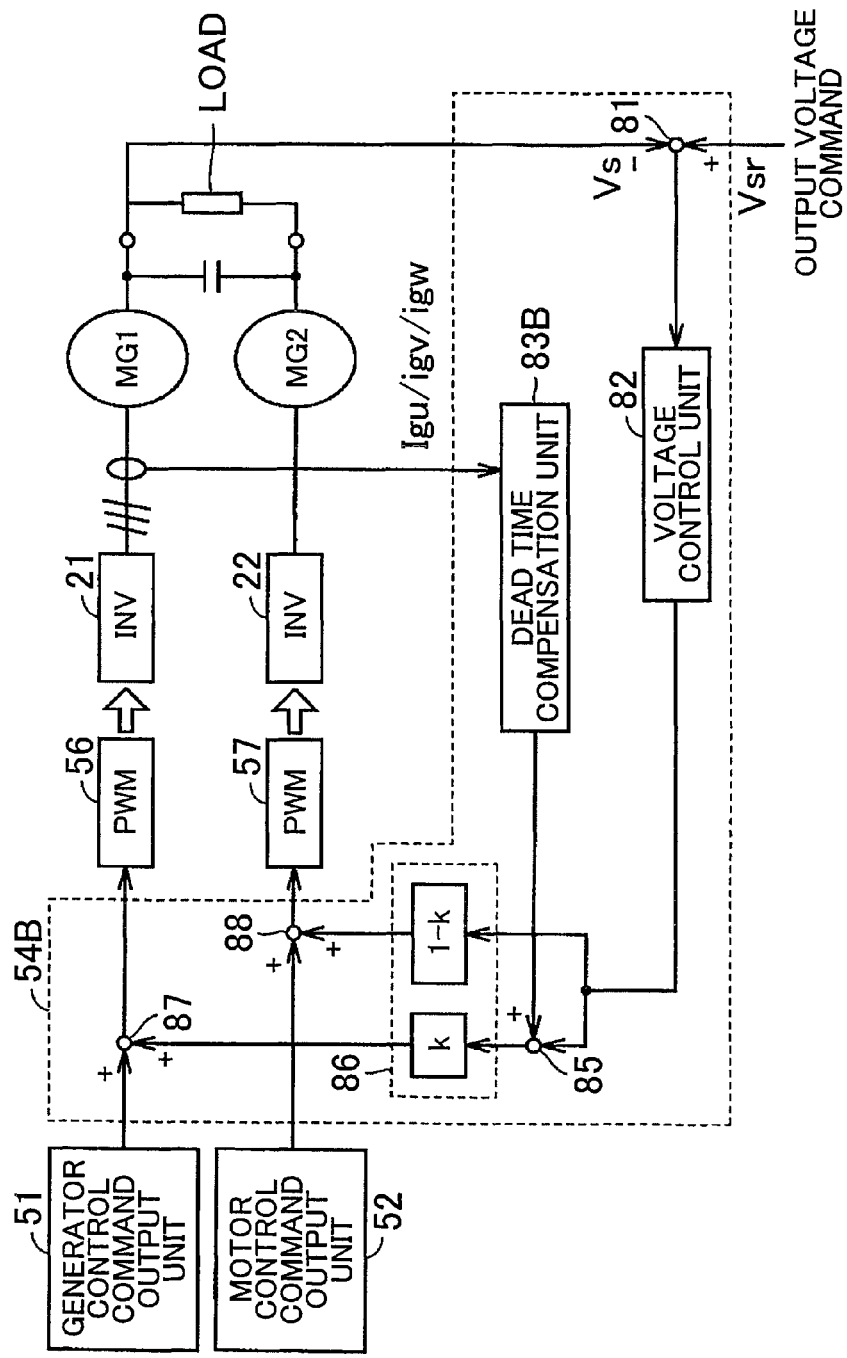
FIG. 29 is a block diagram that shows the configuration of a dead time compensation control unit that is used in a first alternative embodiment.

FIG. 29 is a block diagram that shows the configuration of a dead time compensation control unit 54B that is used in a first alternative embodiment. The dead time compensation control unit 54B differs from the dead time compensation control unit 54 shown in FIG. 19 in that dead time compensation based on the currents of the MG2 is omitted.

As shown in FIG. 29, the dead time compensation control unit 54B includes the subtracter 81, the voltage control unit 82, a dead time compensation unit 83B, the adders 85, 87, 88 and the share determination unit 86. The subtracter 81 computes a difference between the output voltage command value Vsr and the output voltage monitored value Vs. The voltage control unit 82 receives an output of the subtracter 81. The dead time compensation unit 83B outputs a compensation value on the basis of phase currents that are output from the inverter 21 to the motor generator.

The dead time compensation unit 83B outputs a compensation value to the adder 85 in response to the phase currents igu, igv, igw that are output from the inverter 21 to the motor generator MG1.

The adder 85 outputs the result, obtained by adding the output of the voltage control unit 82 to the output of the dead time compensation unit 83B, to the share determination unit 86.

The share determination unit 86 multiplies the output of the adder 85 by the share k and then outputs the obtained result to the adder 87. The adder 87 adds the value that is provided from the share determination unit 86 to the output of the generator control command output unit 51 and then outputs the obtained result to the PWM control unit 56. The share determination unit 86 multiplies the output of the voltage control unit 82 by (1−k) and then outputs the obtained result to the adder 88. The adder 88 adds the value that is provided from the share determination unit 86 to the output of the motor control command output unit 52 and then outputs the obtained result to the PWM control unit 57.

Figure 30:
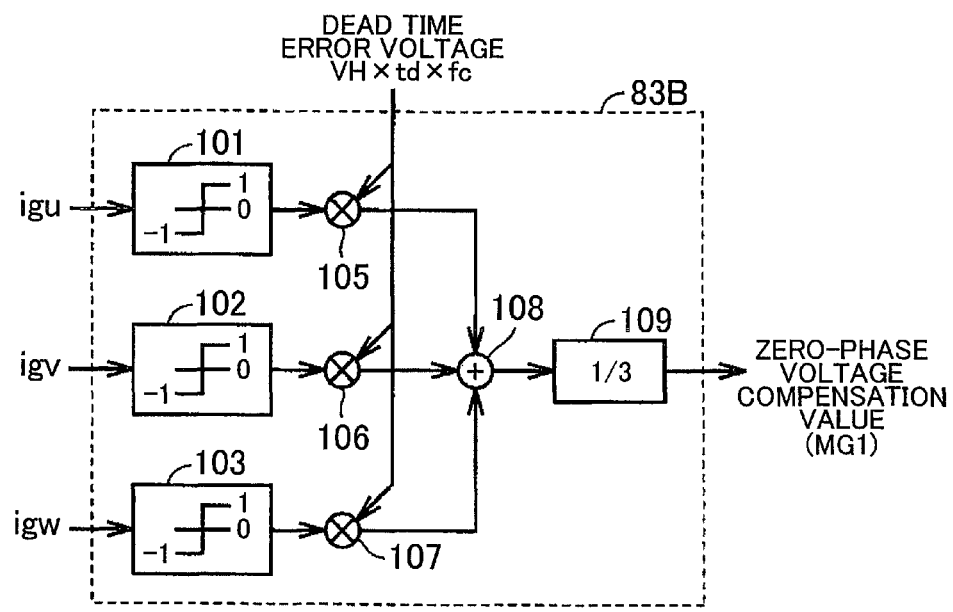
FIG. 30 is a block diagram that shows the configuration of a dead time compensation unit in FIG. 29.

FIG. 30 is a block diagram that shows the configuration of the dead time compensation unit 83B shown in FIG. 29. The dead time compensation unit 83B differs from the dead time compensation unit 83 shown in FIG. 20 in that the dead time compensation unit 92 of the MG2 is omitted.

The dead time compensation unit 83B includes the comparators 101 to 103, the multipliers 105 to 107, the adder 108 and the coefficient multiplier 109. The comparators 101 to 103 respectively compare the phase currents igu, igv, igw with zero. The multipliers 105 to 107 respectively multiply the outputs of the comparators 101 to 103 by the dead time error voltage Vtd (=VH×td×fc). The adder 108 computes the total sum of the outputs of the multipliers 105 to 107. The coefficient multiplier 109 multiplies the output of the adder 108 by a coefficient that is ⅓. The output of the coefficient multiplier 109 is input to the adder 85 shown in FIG. 29 as a voltage compensation value for the motor generator MG1.

Figure 31:
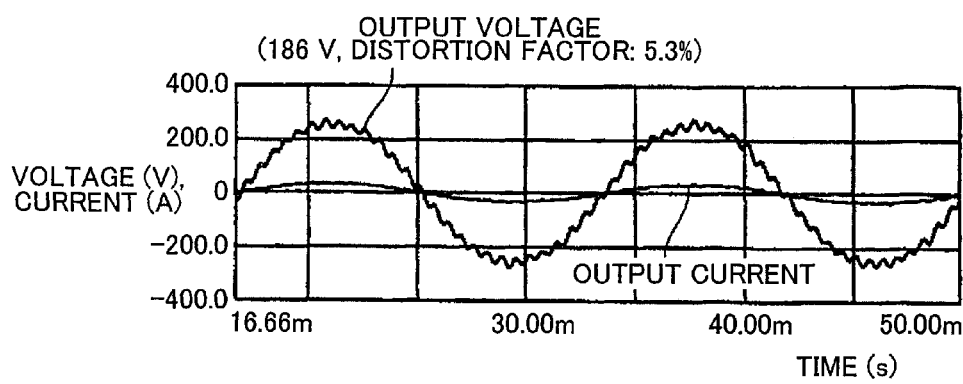
FIG. 31 is a waveform chart of output voltage and output current before measures according to the first alternative embodiment are taken.

FIG. 31 is a waveform chart of output voltage and output current before measures according to the first alternative embodiment are taken. FIG. 32 is a waveform chart of output voltage and output current after the measures according to the first alternative embodiment are taken.

As shown in FIG. 31 and FIG. 32, the output voltage is the effective value of the amplitude, that is, 186 V, and the distortion factor is 5.3% before the measures are taken; whereas the output voltage is the effective value of the amplitude, that is, 200 V, and the distortion factor is improved to 1.3% after the measures are taken.

In this way, only by making a correction on the basis of the polarities of the inverter output currents for driving the motor generator MG1, the quality of voltage that is supplied from the neutral points is significantly improved.

Second Alternative Embodiment

Figure 33:
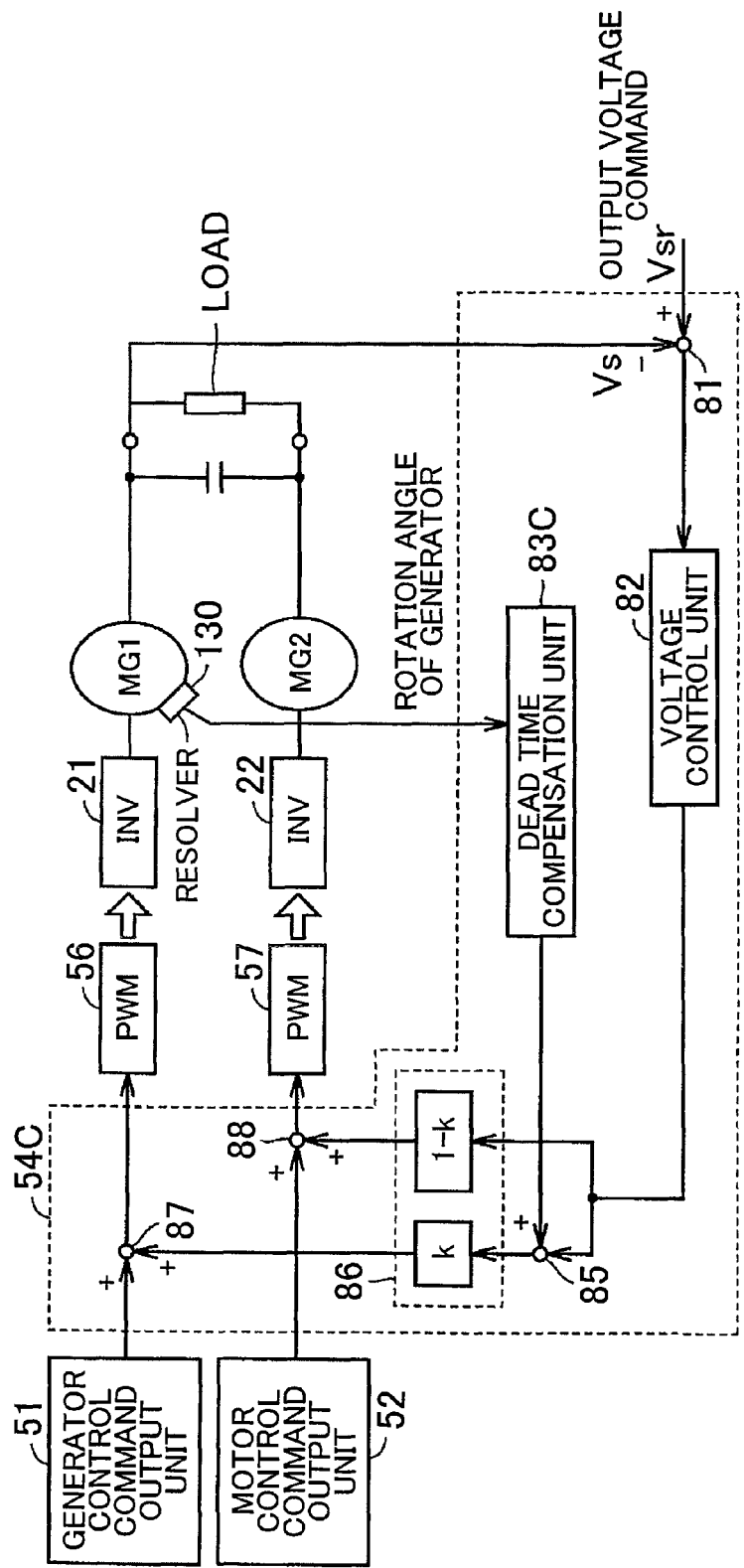
FIG. 33 is a block diagram that shows the configuration of a dead time compensation control unit that is used in a second alternative embodiment.

FIG. 33 is a block diagram that shows the configuration of a dead time compensation control unit 54C that is used in a second alternative embodiment. The dead time compensation control unit 54C differs from the dead time compensation control unit 54 shown in FIG. 22 in that dead time compensation based on the currents of the MG2 is omitted.

As shown in FIG. 33, the dead time compensation control unit 54C includes the subtracter 81, the voltage control unit 82, the dead time compensation unit 83A, the adders 85, 87, 88 and the share determination unit 86. The subtracter 81 computes a difference between the output voltage command value Vsr and the output voltage monitored value Vs. The voltage control unit 82 receives an output of the subtracter 81. The dead time compensation unit 83A outputs a compensation value on the basis of the output of the resolver 130 that detects the rotation angle of the motor generator MG1.

The dead time compensation unit 83C outputs a compensation value to the adder 85 in response to the rotation angle of the motor generator MG1, detected by the resolver 130.

The adder 85 outputs the result, obtained by adding the output of the voltage control unit 82 to the output of the dead time compensation unit 83C, to the share determination unit 86.

The share determination unit 86 multiplies the output of the adder 85 by the share k and then outputs the obtained result to the adder 87. The adder 87 adds the value that is provided from the share determination unit 86 to the output of the generator control command output unit 51 and then outputs the obtained result to the PWM control unit 56. The share determination unit 86 multiplies the output of the voltage control unit 82 by (1−k) and then outputs the obtained result to the adder 88. The adder 88 adds the value that is provided from the share determination unit 86 to the output of the motor control command output unit 52 and then outputs the obtained result to the PWM control unit 57.

Calculation of a compensation value, which is carried out in the dead time compensation unit 83C, is a similar process to the process that is executed in the dead time compensation unit 91A and described in the second embodiment with reference to FIG. 23 to FIG. 28, so the description will not be repeated.

Even with the configuration like the second alternative embodiment shown in FIG. 33 as well, it is possible to supply electric power, in which a dead time error is improved, from the neutral points.

Lastly, the embodiments of the specification will be summarized with reference to the accompanying drawings again. As shown in FIG. 1 and FIG. 2, the external power supply system includes the electrical storage device B, the motor (motor generator MG1), the inverter that drives the motor MG1 by using the electric power of the electrical storage device B, and the control device 50 that controls the inverter. The motor. MG1 includes the stator coils connected to the neutral point. The neutral point is an output node from which electric power from the electrical storage device B is supplied to an external device. The inverter 21 includes the first switching element Q1 and the second switching element Q2 connected in series with each other between the positive electrode power supply line PL2 and the negative electrode power supply line NL. The connection node of the first switching element Q1 and the second switching element Q2 is connected to a corresponding one of the stator coils. The control device 50 inputs driving signals to the inverter 21 so as to drive the inverter 21 such that the voltage at the neutral point becomes the predetermined value. The control device 50 compensates for the driving signals in a dead time period, which is a period in which off-state driving signals are supplied to the first switching element Q1 and the second switching element Q2, on the basis of a current that is input from the connection node to the corresponding one of the stator coils or output from the corresponding one of the stator coils to the connection node while the engine is driven.

The stator coils include the U-phase coil (U), the V-phase coil (V) and the W-phase coil (W) of which one ends are connected to the neutral point. The connection node of the first switching element Q1 and the second switching element Q2 is connected to the other end of the U-phase coil. As shown in FIG. 2, the inverter 21 further includes third and fourth switching elements (V-phase Q1, Q2) and fifth and sixth switching elements (W-phase Q1, Q2). The third and fourth switching elements are connected in series with each other between the positive electrode power supply line and the negative electrode power supply line, and the connection node of the third and fourth switching elements is connected to the other end of the V-phase coil. The fifth and sixth switching elements (W-phase Q1, Q2) are connected in series with each other between the positive electrode power supply line and the negative electrode power supply line, and the connection node of the fifth and sixth switching elements is connected to the other end of the W-phase coil. The current that is input from the connection node to the corresponding one of the stator coils or output from the corresponding one of the stator coils to the connection node includes a current flowing through the U-phase coil, a current flowing through the V-phase coil and a current flowing through the W-phase coil.

Another aspect of the external power supply system shown in FIG. 22 or FIG. 33 includes the electrical storage device B, the motor MG1, the inverter 21 and the control device 50. The inverter 21 drives the motor MG1 by using the electric power of the electrical storage device B. The control device 50 controls the inverter 21. The motor MG1 includes stator coils connected to the neutral point. The inverter 21 includes the first switching element Q1 and the second switching element Q2 connected in series with each other between the positive electrode power supply line and the negative electrode power supply line. The connection node of the first switching element Q1 and the second switching element Q2 is connected to a corresponding one of the stator coils. The control device 50 inputs driving signals to the inverter so as to drive the inverter 21 such that the voltage at the neutral point becomes the predetermined value. The control device 50 compensates for the driving signals in a dead time period, which is a period in which off-state driving signals are supplied to the first switching element Q1 and the second switching element Q2, on the basis of the rotation angle of the motor MG1 while the engine is driven.

In any one of the above-described external power supply systems, the control device 50 may repeatedly compensate for the driving signals on the basis of an error one period before in the output voltage at the neutral point as described with reference to FIG. 10 to FIG. 12 while the engine is not driven.

In any one of the above-described external power supply systems, the control device 50 may compensate for the driving signals in the dead time period when one of the output voltage of the inverter and the carrier frequency of the inverter is changed while the engine is not driven as shown in FIG. 7 and FIG. 8.

Any one of the above-described external power supply systems further includes a second motor (motor generator MG2) and a second inverter. An external load is connected between the neutral point and a second neutral point. The second neutral point is a neutral point of the stator coils of the second motor MG2. As shown in FIG. 7 and FIG. 8, the control device 50 may compensate for the driving signals in the dead time period when the voltage share between the inverter and the second inverter is changed while the engine is not driven.

As shown in FIG. 1, the external power supply system further includes the engine 2. The motor MG1 may be configured to generate electric power upon reception of mechanical power from the engine 2.

The embodiments described above are illustrative and not restrictive in all respects. The scope of the invention is defined by the appended claims rather than the above description. The scope of the invention is intended to encompass all modifications within the scope of the appended claims and equivalents thereof.

What is claimed is:

1. An external power supply system comprising:
   an electrical storage device;
   a motor including stator coils connected to a neutral point, the neutral point being an output node from which electric power from the electrical storage device is supplied to an external device;
   an inverter configured to drive the motor by using the electric power of the electrical storage device, the inverter including a first switching element and a second switching element connected in series with each other between a positive electrode power supply line and a negative electrode power supply line, a connection node of the first switching element and the second switching element being connected to a corresponding one of the stator coils; and
   a control unit configured to control the inverter, the control unit being configured to input driving signals to the inverter so as to drive the inverter such that a voltage at the neutral point becomes a predetermined value, the control unit being configured to compensate for the driving signals in a dead time period, which is a period in which off-state driving signals are supplied to the first switching element and the second switching element, on the basis of a current that is input from the connection node to the corresponding one of the stator coils or output from the corresponding one of the stator coils to the connection node while an engine is driven.

2. The external power supply system according to claim 1, wherein the stator coils include a U-phase coil, a V-phase coil and a W-phase coil of which one ends are connected to the neutral point,
   the connection node of the first switching element and the second switching element is connected to the other end of the U-phase coil,
   the inverter further includes a third switching element, a fourth switching element, a fifth switching element and a sixth switching element, the third switching element and the fourth switching element being connected in series with each other between the positive electrode power supply line and the negative electrode power supply line, a connection node of the third switching element and the fourth switching element being connected to the other end of the V-phase coil, the fifth switching element and the sixth switching element being connected in series with each other between the positive electrode power supply line and the negative electrode power supply line, a connection node of the fifth switching element and the sixth switching element being connected to the other end of the W-phase coil, and
   the current that is input from the connection node to the corresponding one of the stator coils or output from the corresponding one of the stator coils to the connection node includes a current flowing through the U-phase coil, a current flowing through the V-phase coil and a current flowing through the W-phase coil.

3. The external power supply system according to claim 1, wherein
   the control unit is configured to repeatedly compensate for the driving signals on the basis of an error one period before in an output voltage at the neutral point while the engine is not driven.

4. The external power supply system according to claim 1, wherein
   the control unit is configured to compensate for the driving signals in the dead time period when one of an output voltage of the inverter and a carrier frequency of the inverter is changed while the engine is not driven.

5. The external power supply system according to claim 1, further comprising:
   a second motor and a second inverter, wherein
   an external load is connected between the neutral point and a second neutral point,
   the second neutral point is a neutral point of stator coils of the second motor, and
   the control unit is configured to compensate for the driving signals in the dead time period when a voltage share between the inverter and the second inverter is changed while the engine is not driven.

6. The external power supply system according to claim 1, further comprising: an engine, wherein the motor is configured to be able to generate electric power upon reception of mechanical power from the engine.

7. An external power supply system comprising:
   an electrical storage device;
   a motor including stator coils connected to a neutral point;
   an inverter configured to drive the motor by using the electric power of the electrical storage device, the inverter including a first switching element and a second switching element connected in series with each other between a positive electrode power supply line and a negative electrode power supply line, a connection node of the first switching element and the second switching element being connected to a corresponding one of the stator coils; and
   a control unit configured to control the inverter, the control unit being configured to input driving signals to the inverter so as to drive the inverter such that a voltage at the neutral point becomes a predetermined value, the control unit being configured to compensate for the driving signals in a dead time period, which is a period in which off-state driving signals are supplied to the first switching element and the second switching element, on the basis of a period of the neutral point output voltage harmonic which is calculated from a rotation angle of the motor, while an engine is driven.

* * * * *